United States Patent
Khanna et al.

(10) Patent No.: US 11,145,023 B2
(45) Date of Patent: Oct. 12, 2021

(54) GRAPHICAL INTERFACE OF A DRIVER APPLICATION IN RIDE-SHARING SYSTEM

(71) Applicant: SC INNOVATIONS, INC., San Francisco, CA (US)

(72) Inventors: Jahan Khanna, San Francisco, CA (US); Robert Wong, Burlingame, CA (US); Sunil Paul, San Francisco, CA (US); Thomas Gellatly, San Francisco, CA (US); Gregory Boutte, Menlo Park, CA (US); Cesar Torres, San Francisco, CA (US); Lee Fastenau, San Francisco, CA (US); Yik Kit (Nelson) To, Dublin, CA (US); Robert Moran, San Francisco, CA (US)

(73) Assignee: SC INNOVATIONS, INC., San Francisco, CA (US)

( * ) Notice: Subject to any disclaimer, the term of this patent is extended or adjusted under 35 U.S.C. 154(b) by 308 days.

(21) Appl. No.: 16/121,250

(22) Filed: Sep. 4, 2018

(65) Prior Publication Data
US 2018/0374182 A1 Dec. 27, 2018

Related U.S. Application Data

(63) Continuation of application No. 14/602,442, filed on Jan. 22, 2015, now abandoned.
(Continued)

(51) Int. Cl.
*G06Q 50/30* (2012.01)
*G06Q 30/02* (2012.01)
(Continued)

(52) U.S. Cl.
CPC ......... *G06Q 50/30* (2013.01); *G01C 21/3438* (2013.01); *G06Q 30/0284* (2013.01); *G06Q 30/0629* (2013.01)

(58) Field of Classification Search
CPC ............... G06Q 50/30; G06Q 30/0284; G06Q 30/0629; G01C 21/3438
See application file for complete search history.

(56) References Cited

U.S. PATENT DOCUMENTS

| 2009/0216600 A1 | 8/2009 | Hill |
| 2010/0153279 A1 | 6/2010 | Zahn |

(Continued)

FOREIGN PATENT DOCUMENTS

WO 2015/112669 A1 7/2015

OTHER PUBLICATIONS

T-Share: A Large-Scale Dynamic Taxi Ridesharing Service published by University of Illinois at Chicago (Year: 2013).*
(Continued)

*Primary Examiner* — Zeina Elchanti
(74) *Attorney, Agent, or Firm* — Ascenda Law Group, PC

(57) ABSTRACT

Systems and methods for providing a transportation marketplace are provided. A transportation server receives, from a client device of a user, a request for a transportation service. The transportation server determines a set of drivers in response to the request, the set of drivers further being available to provide the transportation service when the request is received. The transportation server provides the set of drivers to the client device, wherein each driver within the set of drivers is selectable by the user of the client device.

19 Claims, 31 Drawing Sheets

Related U.S. Application Data

(60) Provisional application No. 61/930,368, filed on Jan. 22, 2014.

(51) Int. Cl.
*G06Q 30/06* (2012.01)
*G01C 21/34* (2006.01)

(56) References Cited

U.S. PATENT DOCUMENTS

| | | |
|---|---|---|
| 2011/0059693 A1 | 3/2011 | O'Sullivan |
| 2011/0145089 A1* | 6/2011 | Khunger .............. G06Q 10/047 |
| | | 705/26.4 |
| 2011/0153453 A1 | 6/2011 | Ghafoor et al. |
| 2011/0184774 A1 | 7/2011 | Forstall et al. |
| 2012/0131170 A1* | 5/2012 | Spat ........................ H04L 67/04 |
| | | 709/223 |
| 2012/0203599 A1 | 8/2012 | Choi et al. |
| 2012/0290652 A1 | 11/2012 | Boskovic |
| 2013/0290040 A1* | 10/2013 | Perry ..................... G06Q 50/10 |
| | | 705/5 |
| 2014/0152254 A1 | 6/2014 | Juhasz |
| 2018/0211194 A1* | 7/2018 | Camp ................... G06Q 50/30 |

OTHER PUBLICATIONS

International Search Report dated May 5, 2015, from the International Searching Authority (US), for International Patent Application No. PCT/US2015/012376 (filed Jan. 22, 2015), 2 pgs.

Written Opinion of the International Searching Authority dated May 5, 2015, from the International Searching Authority (US), for International Patent Application No. PCT/US2015/012376 (filed Jan. 22, 2015), 7 pgs.

\* cited by examiner

GRAPHICAL INTERFACE OF A DRIVER APPLICATION IN RIDE-SHARING SYSTEM

RELATED APPLICATIONS

This application is Continuation of U.S. application Ser. No. 14/602,442, filed on 22 Jan. 2015, which is a nonprovisional of and claims priority to U.S. Provisional Application No. 61/930,368, filed 22 Jan. 2014, both of which are incorporated by reference herein.

FIELD OF THE INVENTION

The present disclosure generally relates to transportation services, and more specifically, to systems and methods for providing a transportation marketplace.

BRIEF DESCRIPTION OF THE DRAWINGS

Some embodiments are illustrated by way of example and not of limitation in the figures of the accompanying drawings.

DETAILED DESCRIPTION OF THE INVENTION

Figure 1:
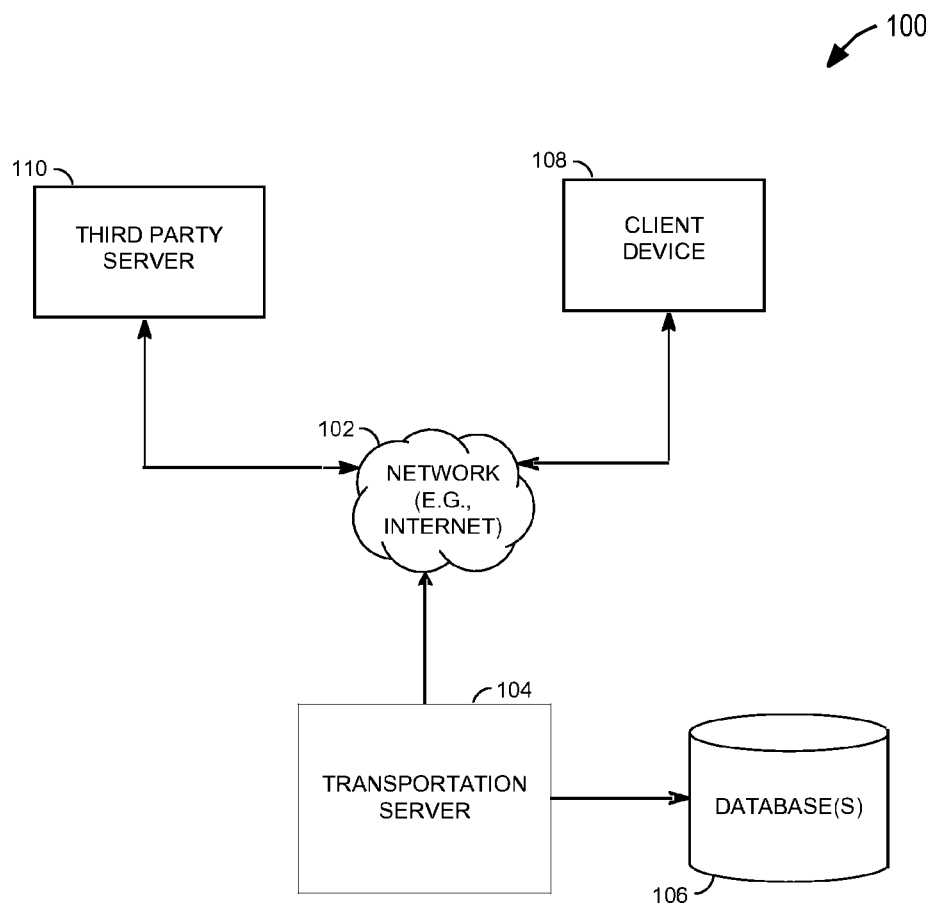
FIG. 1 is a schematic diagram showing an example of a system for providing a transportation marketplace, according to some embodiments.

Example systems and methods for providing a transportation marketplace are described. In the following description, for purposes of explanation, numerous specific details are set forth in order to provide a thorough understanding of example embodiments. It will be evident, however, to one skilled in the art that the present technology may be practiced without these specific details.

A transportation marketplace described herein provides a real-time list of available drivers from which a user selects when requesting a transportation service. The transportation marketplace is available to a user via a passenger application on a client device of the user. A user requests a transportation service using the transportation marketplace.

For example, the user indicates a request for transportation to a particular location. The request is sent to a transportation server capable of facilitating communication between available drivers and passengers requesting transportation. The request from a user indicates any information relevant to the transportation service requested, including a pickup location, a drop-off location, a price preference, a driver rating, a driver response rate, a casual carpooling preference, a preferred estimated time of arrival, vehicle choice, a favorite driver, and the like. In some embodiments, the client device of the user determines the current location of the user (e.g., using the Global Positioning System (GPS)) and utilizes the determined location to automatically generate a pickup location from which the user is to be picked up. In some embodiments, the automatically generated pickup location is based on location determined using GPS and any other relevant information, such as the user's history of pickup locations near the determined location, known or common pickup locations near the determined location (e.g., a park, restaurant, etc.), and the like.

When the request is sent to the transportation service, a set of drivers that are available to fulfill the request is determined and provided to the user. The list of available drivers is provided based on availability and is provided to a user in a manner that is sorted based on any suitable criteria. In some embodiments, the user specifies the criteria (i.e. settings, preferences) preferred by the user. For example, the list of available drivers is sorted by price, distance of the driver from the user's pickup location, the type of vehicle of the driver, a rating of the driver, an average response time of the driver, an estimated time of arrival of the driver, a driver's indication of casual carpooling, number of seats in the vehicle, and the like.

When a user selects a particular driver from the list of drivers provided to the user's client device, a request is sent to the driver via the transportation server, and the driver either accepts or denies the request. A driver receives the request via a driver application on a client device of the driver. In some embodiments, the driver application allows (i.e. provides functionality that allows) a driver to specify preferences for requests that the driver would like to receive from potential passengers. The preferences may be any preferences relevant to transportation requests to which the driver would like to respond, including pickup location, drop-off location, price, a rating of a passenger, a casual carpool preference, and the like.

In some embodiments, prior to booking a transportation service for a potential passenger, the transportation server receives requested pick-up and drop-off locations from the potential passenger's client application. The transportation server determines a current location of an available driver. The transportation determines a projected route based on the requested pick-up and drop-off locations and the available driver's current location. The transportation server calculates a fare based on a fixed base fare, the mileage of the projected route, a mileage rate, an estimated amount of time required to complete the projected route and a time rate. It is understood that the fare can be further adjusted based on various preferences selected by the available driver. The transportation server sends the calculate fare to the potential passenger's client application such that the calculated fare and an identification and description of the available driver will be displayed by the potential passenger's client application. The transportation server receives a selection of the available driver and the calculate fare from the potential passenger's client application.

The transportation server determines whether the potential passenger and/or the projected route is compatible with one or more preferences selected by the available driver. Upon determining compatibility, the transportation server sends a booking request for the potential passenger to the driver's client application. The transportation server receives a selection of the booking request from the driver's client application.

Once the ride is booked, the transportation server continually tracks the location of the driver as the driver transports the passenger to the requested drop-off location. Based on such continual tracking, the transportation server determines an actual route that the driver traveled. The transportation server compares the projected route and the actual route to determine a route difference. If a route difference exists, the transportation server compares the route difference to a route difference threshold. If the route difference threshold is satisfied, that is, the route difference exceeds a minimum required route difference, the transportation server determines that the actual route may have included a detour from the projected route. The transportation server requests the driver to confirm whether a detour from the projected route occurred. Upon receiving a confirmation of the detour from the driver's client application, the transportation server determines a detour price based on the detour mileage, the mileage rate, the time it took to travel the detour mileage and the time rate. The transportation server charges the passenger according to the detour price and the originally calculated fare.

FIG. 1 is a schematic diagram showing an example of a system 100 for providing a transportation marketplace. The system 100 includes a transportation server 104, one or more client devices 108, and a third party server 110. The components of the system 100 are connected directly or over a network 102, which may be any suitable network. In various embodiments, one or more portions of the network 102 may include any of: an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The transportation server 104 includes a network-addressable computing system that facilitates communication between drivers and passengers and obtains and utilizes data relevant to drivers and/or passengers stored in the database(s) 106. It is understood that any of the operations described herein can be performed by the transportation server 104.

The client device 108 is any suitable computing device that is used by a driver and/or a passenger to communicate with one another, such as a smart phone, a personal digital assistant (PDA), a mobile phone, a personal computer, a laptop, a computing tablet, or any other device suitable for communication.

The third party server 110 is any server that may be accessed by the transportation server 104 and/or the client device 108 to obtain information relevant to transportation services (e.g., public transportation, location-based services, etc.).

Figure 2:
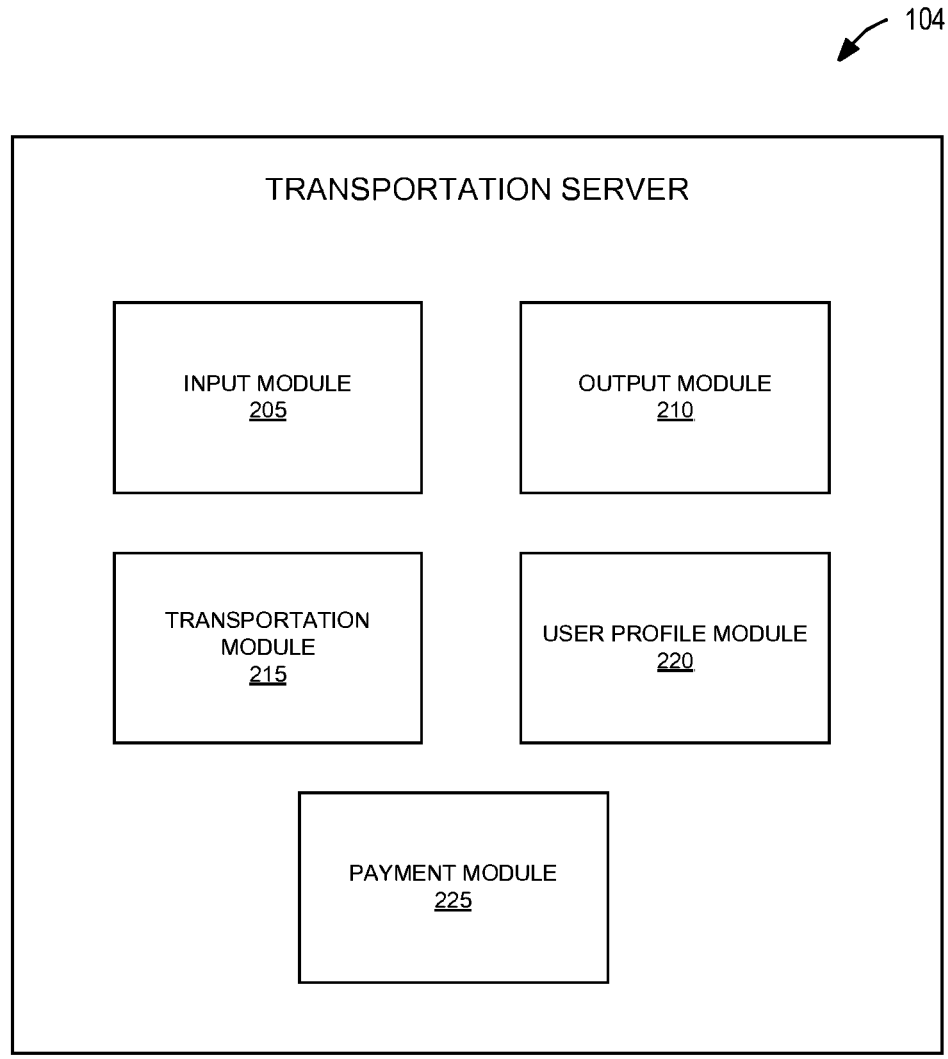
FIG. 2 is a block diagram showing example components of a transportation server, according to some embodiments.

FIG. 2 is a block diagram showing example components of a transportation server 104. The transportation server 104 includes an input module 205, an output module 210, a transportation module 215, a user profile module 220, and a payment module 225.

The input module 205 is a hardware-implemented module which receives and processes any inputs from one or more components of system 100 of FIG. 1 (e.g., one or more client devices 108, third party server 110, etc.). The inputs may include requests related to transportation, payment information, and the like.

The output module 210 is a hardware-implemented module which sends any outputs to one or more components of system 100 of FIG. 1 (e.g., one or more client devices 108, third party server 110, etc.). The outputs may include information about available drivers, passengers requesting transportation, and the like.

The transportation module 215 is a hardware-implemented module which manages, facilitates, and controls transportation requests from passengers and/or drivers. For example, when a request for transportation is received from a passenger, the transportation module 215 determines and generates a list of drivers available to fulfill the request.

The user profile module 220 is a hardware-implemented module which manages, controls, stores, and accesses information associated with drivers and/or passengers. The information may be stored in and accessed from the database(s) 106 shown in FIG. 1. The information managed by the user profile module 220 may include any information associated with a driver and/or passenger, such as preferences, vehicle information, background information of a driver, ratings of drivers and/or passengers, payment information of drivers and/or passengers, and the like.

The payment module 225 is a hardware-implemented module which manages, facilitates, and controls payments between drivers and passengers. The payment module 225 also determines suggested prices associated with transportation requests based on the characteristics of the request (e.g., distance to be traveled, etc.).

Figure 3:
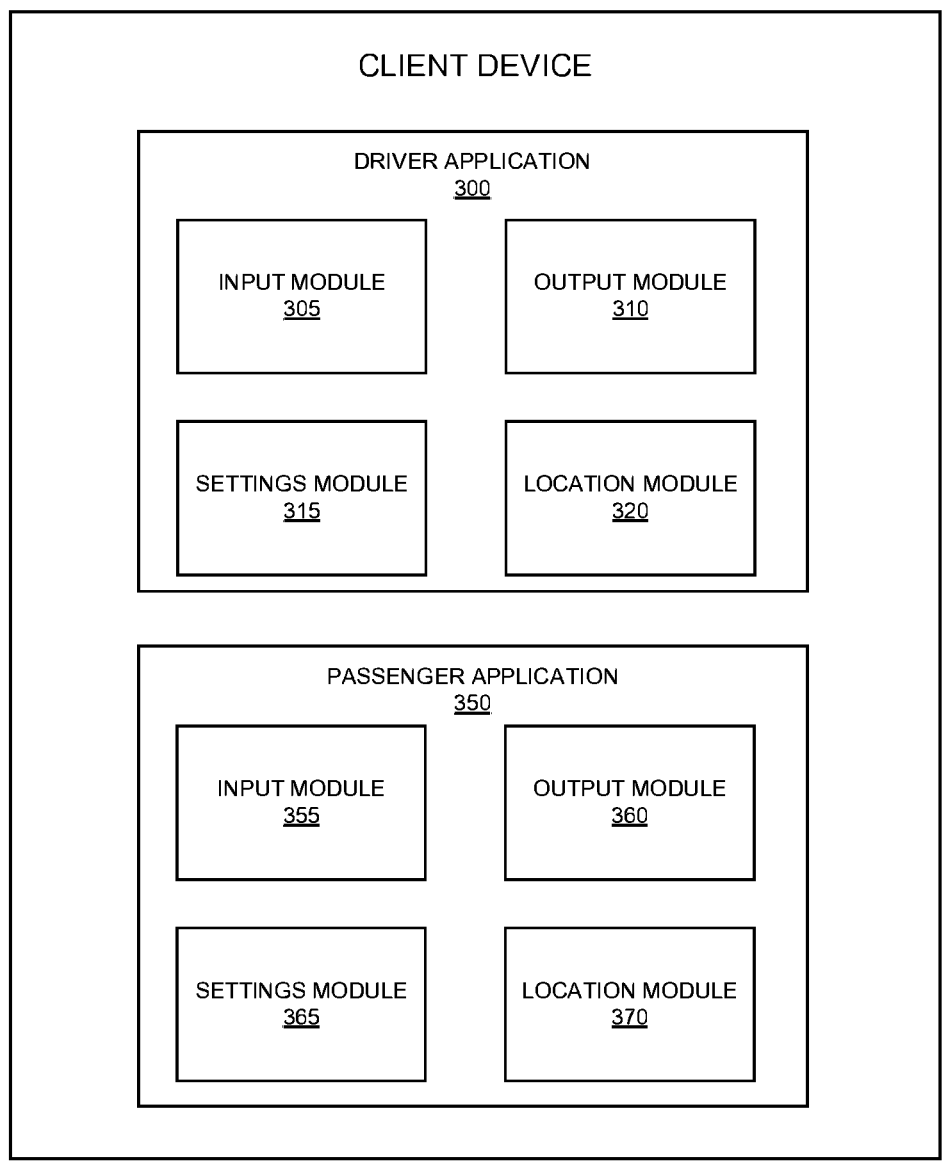
FIG. 3 is a block diagram showing example components of a client device, according to some embodiments.

FIG. 3 is a block diagram showing example components of a client device 108. The client device is a computing device of a driver and/or a passenger and includes a driver application 300 and/or a passenger application 350.

The driver application 300 is a software application associated with the transportation server 104 of FIGS. 1-2. The driver application includes an input module 305, an output module 310, a settings module 315, and a location module 320.

The input module 305 is a hardware-implemented module that receives and processes any inputs from a driver, including inputs related to responses to transportation requests from a passenger, inputs related to preferences of the driver, and the like.

The output module 310 is a hardware-implemented module that sends any outputs to one or more components of system 100 of FIG. 1 (e.g., other client devices 108, third party server 110, transportation server 104, etc.). The outputs include responses to transportation requests, location of the client device 108, and the like.

The settings module 315 is a hardware-implemented module that manages, stores, and accesses settings indicated by a driver, such as pickup location, drop-off location, price, a rating of a passenger, a casual carpool preference, and the like.

The location module 320 is a hardware-implemented module that determines a location of the client device 108. The location module 320 determines location in any suitable manner (e.g., using a third party server 110, GPS capabilities on the client device 108, etc.).

The passenger application 350 is a software application associated with the transportation server 104 of FIGS. 1-2. The passenger application includes an input module 355, an output module 360, a settings module 365, and a location module 370.

The input module 355 is a hardware-implemented module that receives and processes any inputs from a passenger, including inputs related to a transportation request, inputs related to preferences of the passenger, and the like.

The output module 360 is a hardware-implemented module that sends any outputs to one or more components of system 100 of FIG. 1 (e.g., other client devices 108, third party server 110, transportation server 104, etc.). The outputs include transportation requests, location of the client device 108, and the like.

The settings module 365 is a hardware-implemented module that manages, stores, and accesses settings indicated by a passenger, such as a pickup location, a drop-off location, a price preference, a driver rating, a driver response rate, a casual carpooling preference, a preferred estimated time of arrival, and the like.

The location module 370 is a hardware-implemented module that determines a location of the client device 108. The location module 370 determines location in any suitable manner (e.g., using a third party server 110, GPS capabilities on the client device 108, etc.).

Figure 4:
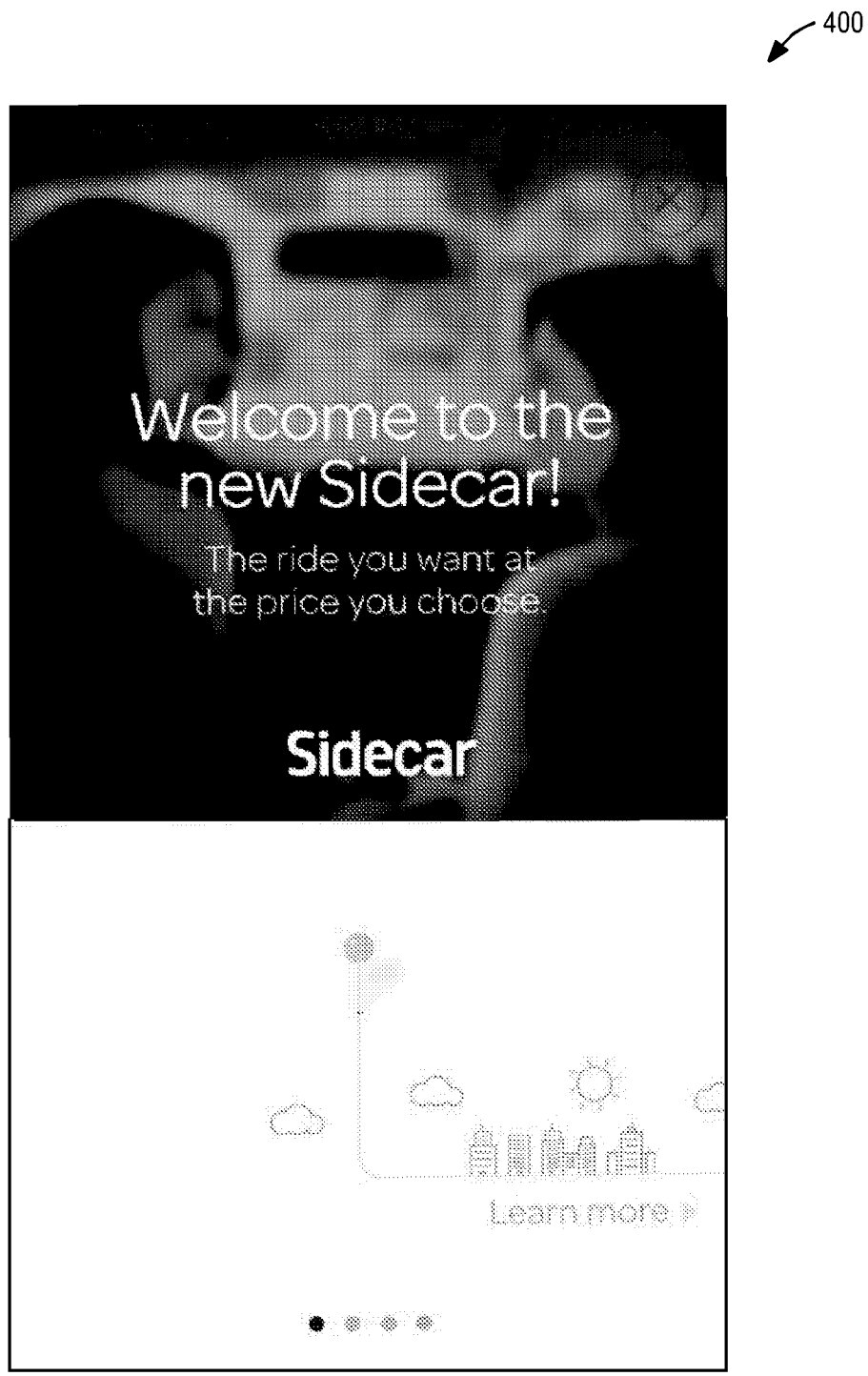
FIGS. 4-27 are interface diagrams illustrating example user interfaces associated with a transportation marketplace, according to some embodiments.

FIGS. 4-26 are interface diagrams illustrating example user interfaces associated with a transportation marketplace. In FIG. 4, a user interface 400 is shown, which is an introductory screen shown when a passenger initially downloads and installs and accesses the passenger application 350 on their client device.

Figure 5:
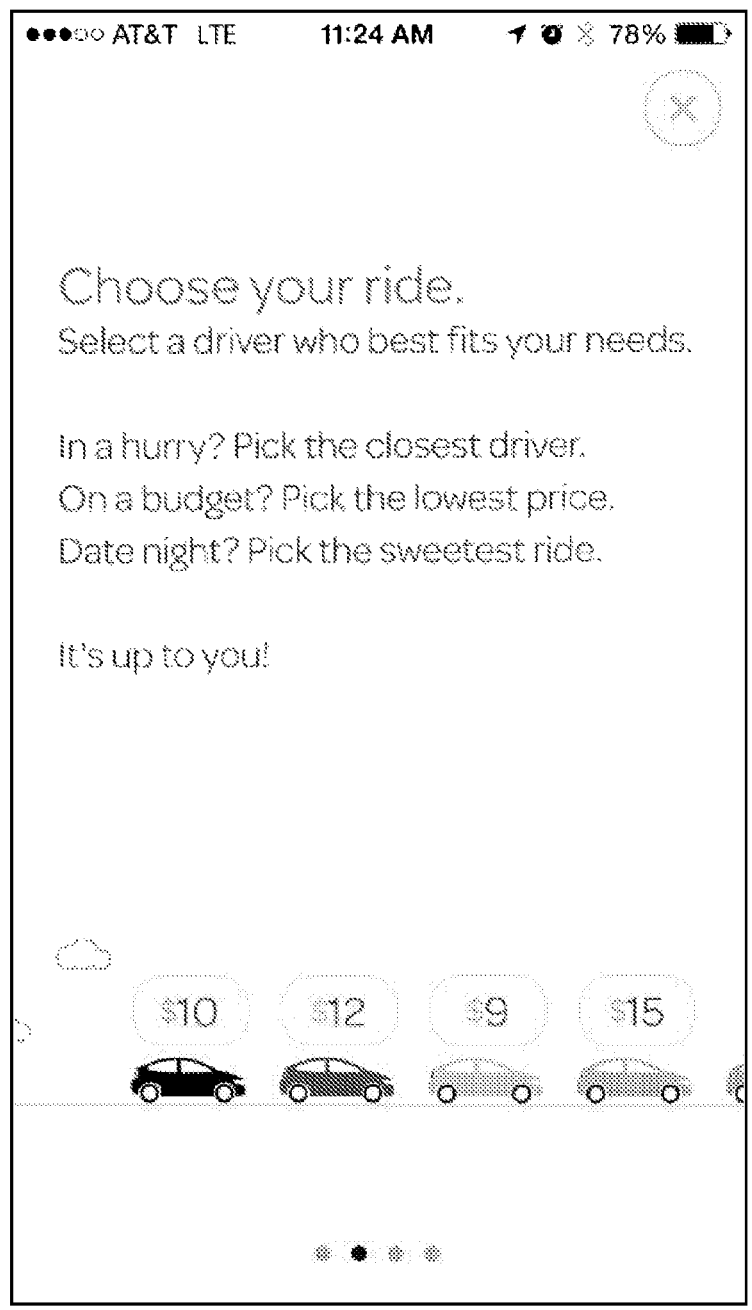

In FIG. 5, a user interface 500 is shown, which is another introductory screen shown to a passenger through the passenger application 350. The user interface 500 explains that, in some embodiments, a driver is selected based on the passenger's preferences.

Figure 6:
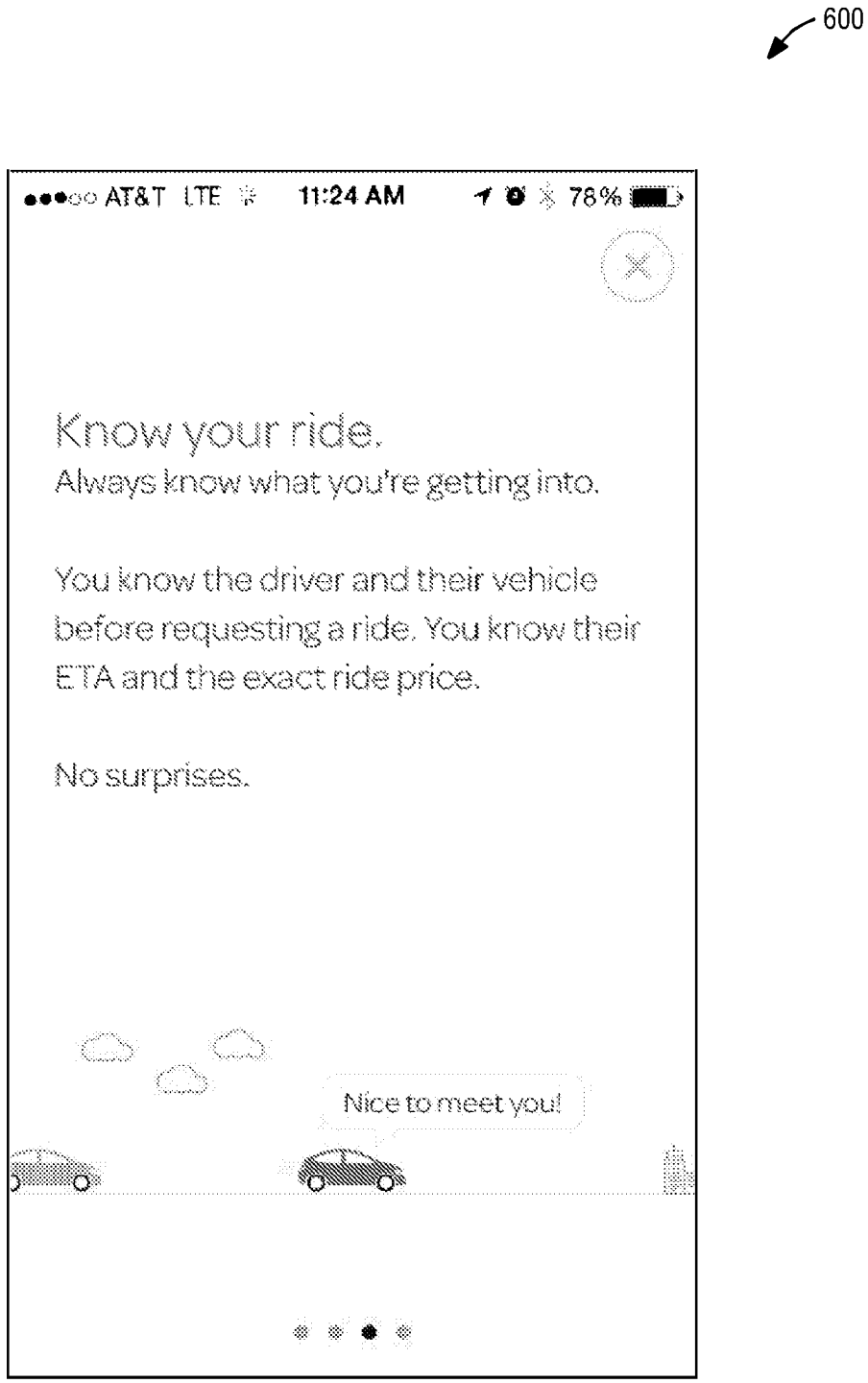

In FIG. 6, a user interface 600 is shown, which is another introductory screen shown to a passenger through the passenger application 350. The user interface 600 explains that the passenger receives any suitable amount of information available about a driver.

Figure 7:
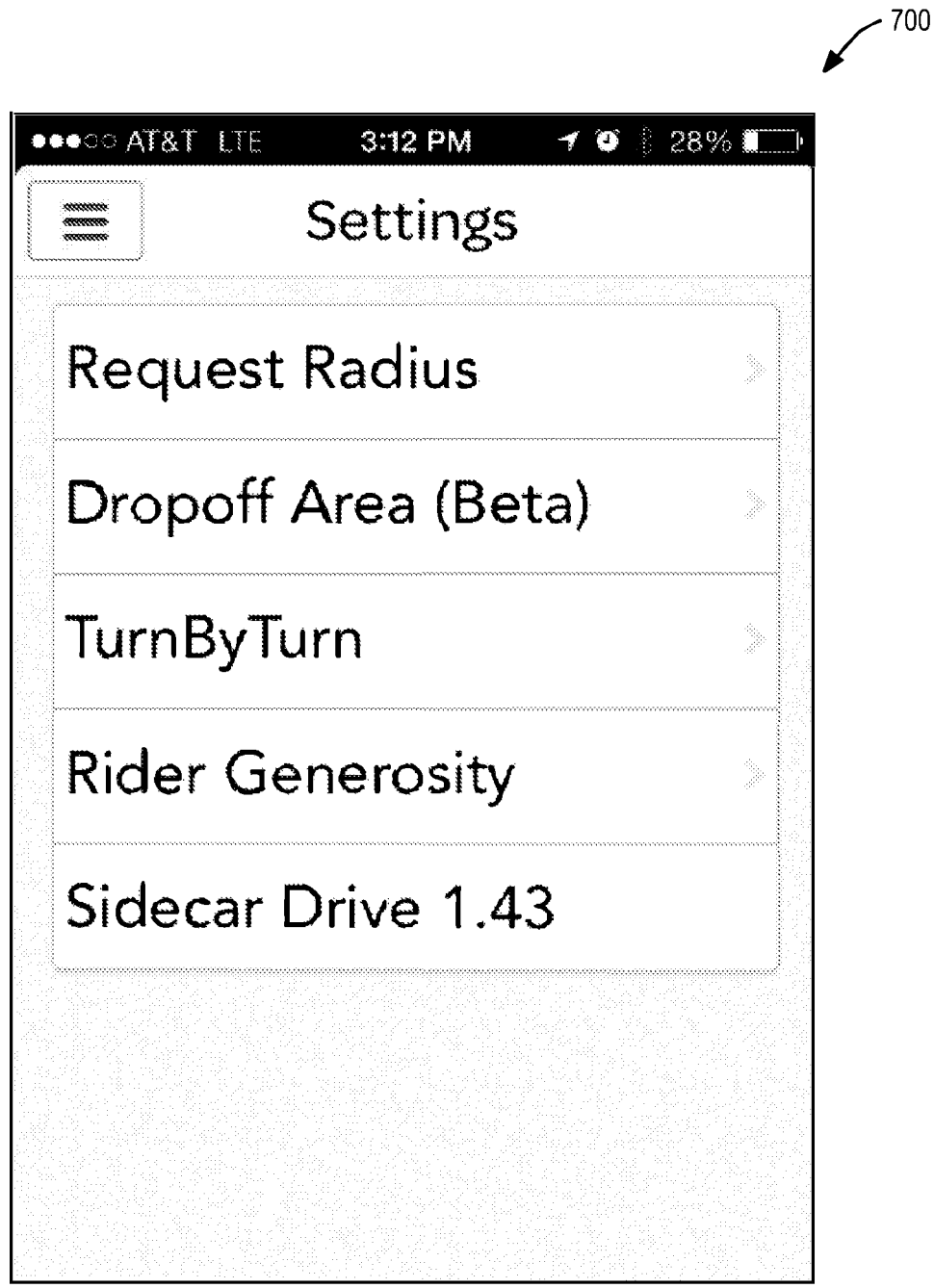

In FIG. 7, a user interface 700 is shown, which is a screen displaying selectable settings (or preferences), such as "Request Radius", "Dropoff Area", TurnByTurn", "Rider Generosity", that a driver accesses through the driver application 300. For example, by selecting the "Request Radius" setting, the driver utilizes user interface 700 to indicate a particular request radius such that the driver receives passenger requests from passengers within a particular radial distance from the driver's current location or a location selected by the driver.

Figure 8:
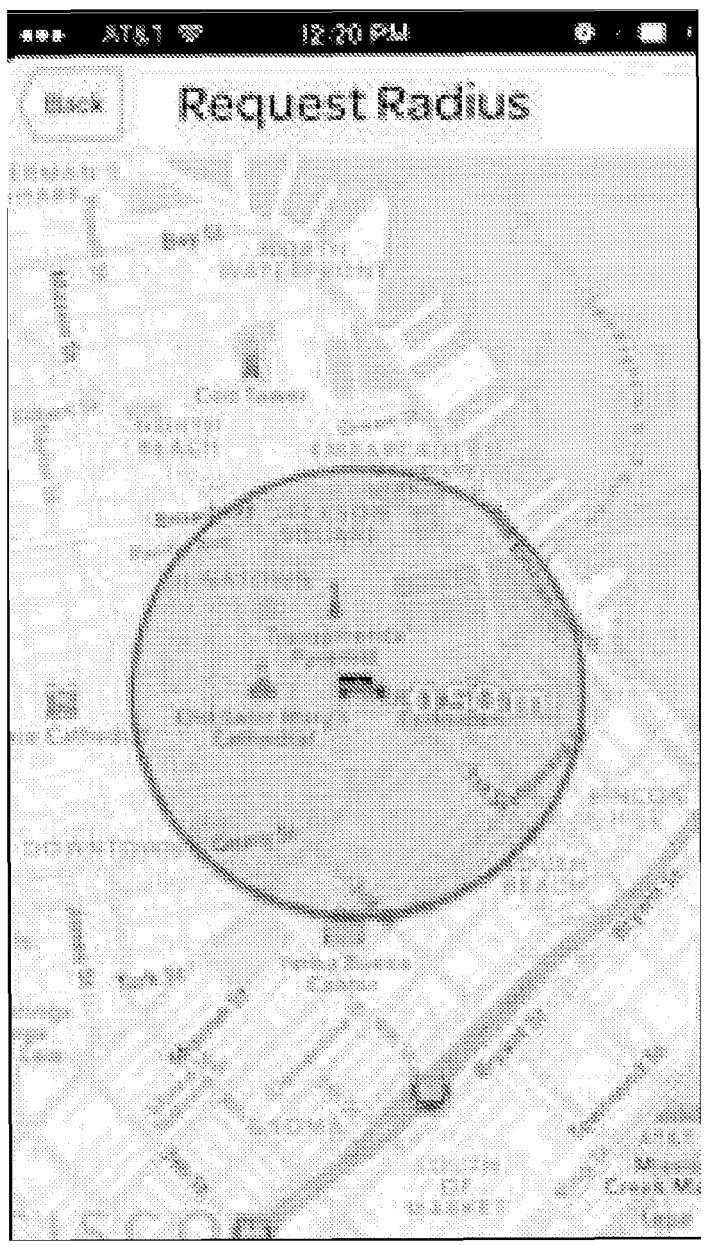

FIG. 8 shows an example user interface 800 for providing the request radius setting. In FIG. 8, based on the driver's selection, the radius is set to 0.50 miles from the driver's location such that the driver will receive requests from passengers that are currently located within 0.50 miles of the driver at any given time. While a graphic circle centered around the driver is shown in FIG. 8, one of ordinary skill in the art will note that any shape and/or any fixed location within the shape may be used. It is understood that the driver may set the radius according to any radial distance the driver prefers.

Figure 9:
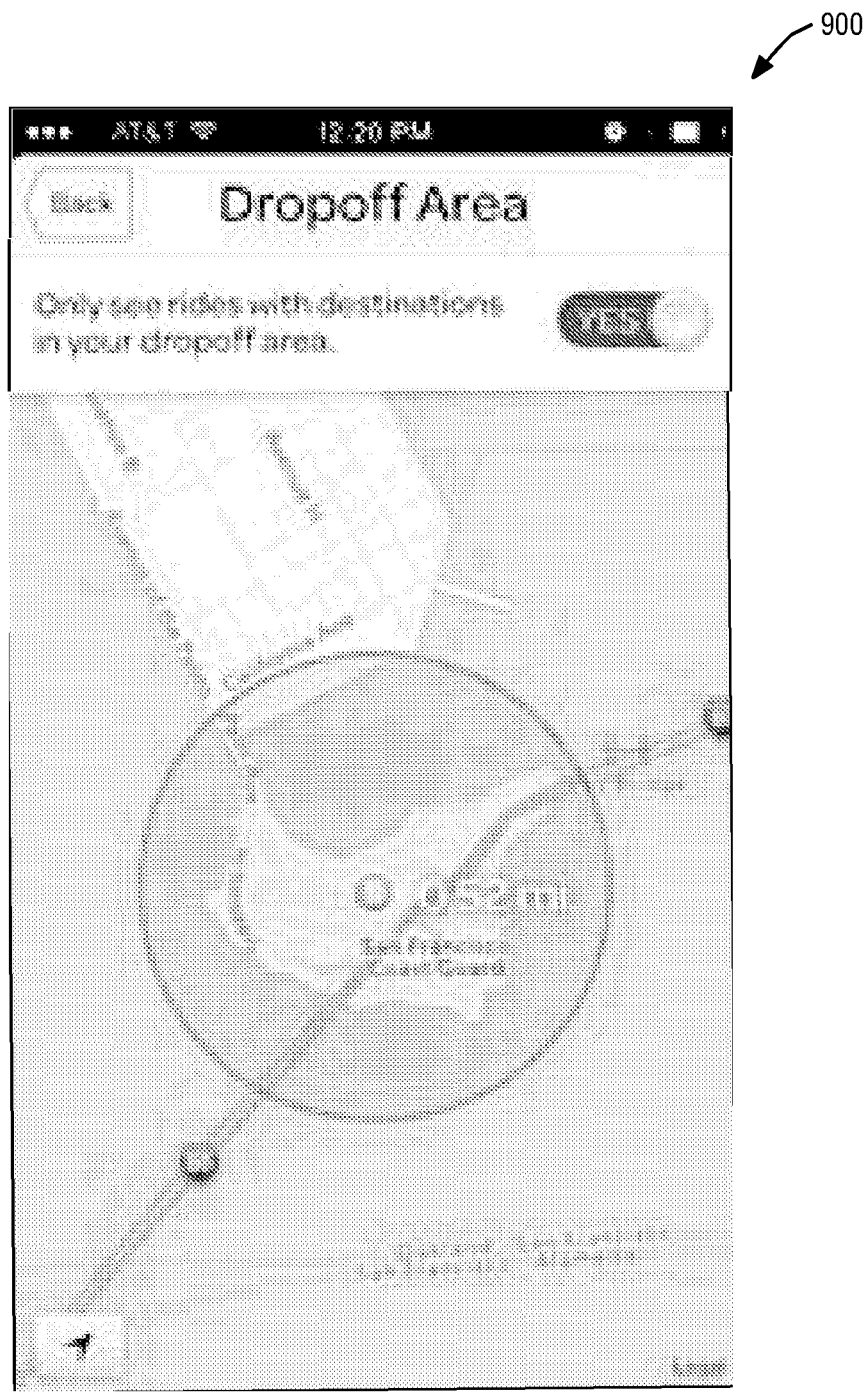

The user interface 700 of FIG. 7 also allows (i.e. provides functionality that allows) a driver to set a particular drop-off area such that the driver receives passenger requests from passengers who are requesting to be dropped off within a particular drop-off area. FIG. 9 shows an example user interface 900 for setting a drop-off area such that the driver receives requests from passengers that request to be dropped off within the particular drop-off area set. This is useful for drivers who would like to drive a passenger to a drop-off area near a particular location (e.g., the driver's home). While a circle centered around a particular point on the map is shown in FIG. 9, one of ordinary skill in the art will note that any shape and/or any fixed location within the shape may be used. As shown in FIG. 9, the driver has set the drop-off area to be based on a radius of 0.52 miles for the "Request Radius" setting of FIG. 7. It is understood that the driver may set the drop-off area according to any radial distance the driver prefers.

Figure 10:
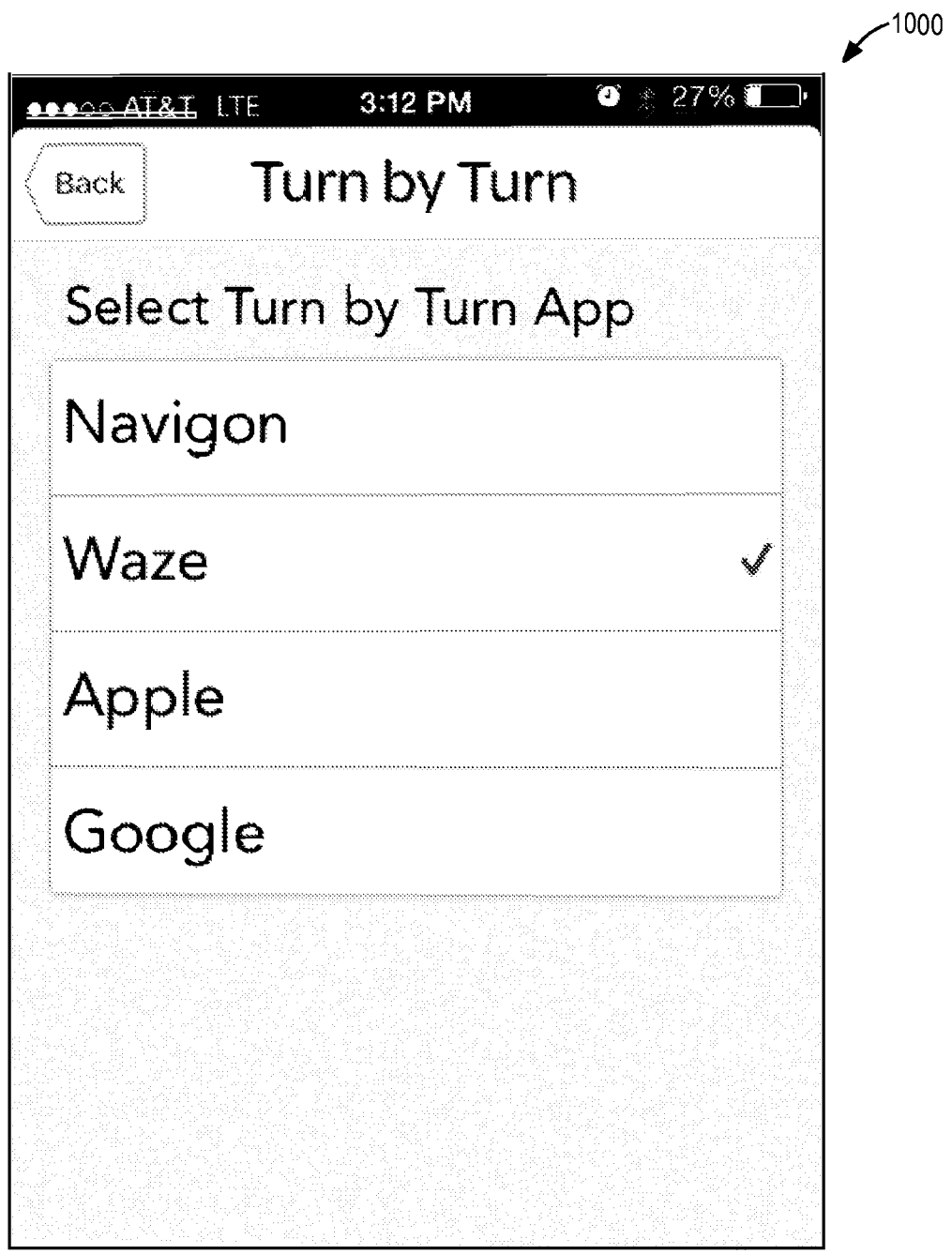

The user interface 700 of FIG. 7 allows a driver to access turn by turn directions for routes between the requesting passenger's pickup and drop-off locations. FIG. 10 shows an example user interface 1000 for selecting a particular third-party navigation application ("Navigon", "Waze", "Apple", "Google") to use for the turn by turn directions. As shown in FIG. 10, the driver has selected the "Waze" third-party navigation application to be used for turn by turn directions as the "TurnByTurn" setting of FIG. 7.

Figure 11:
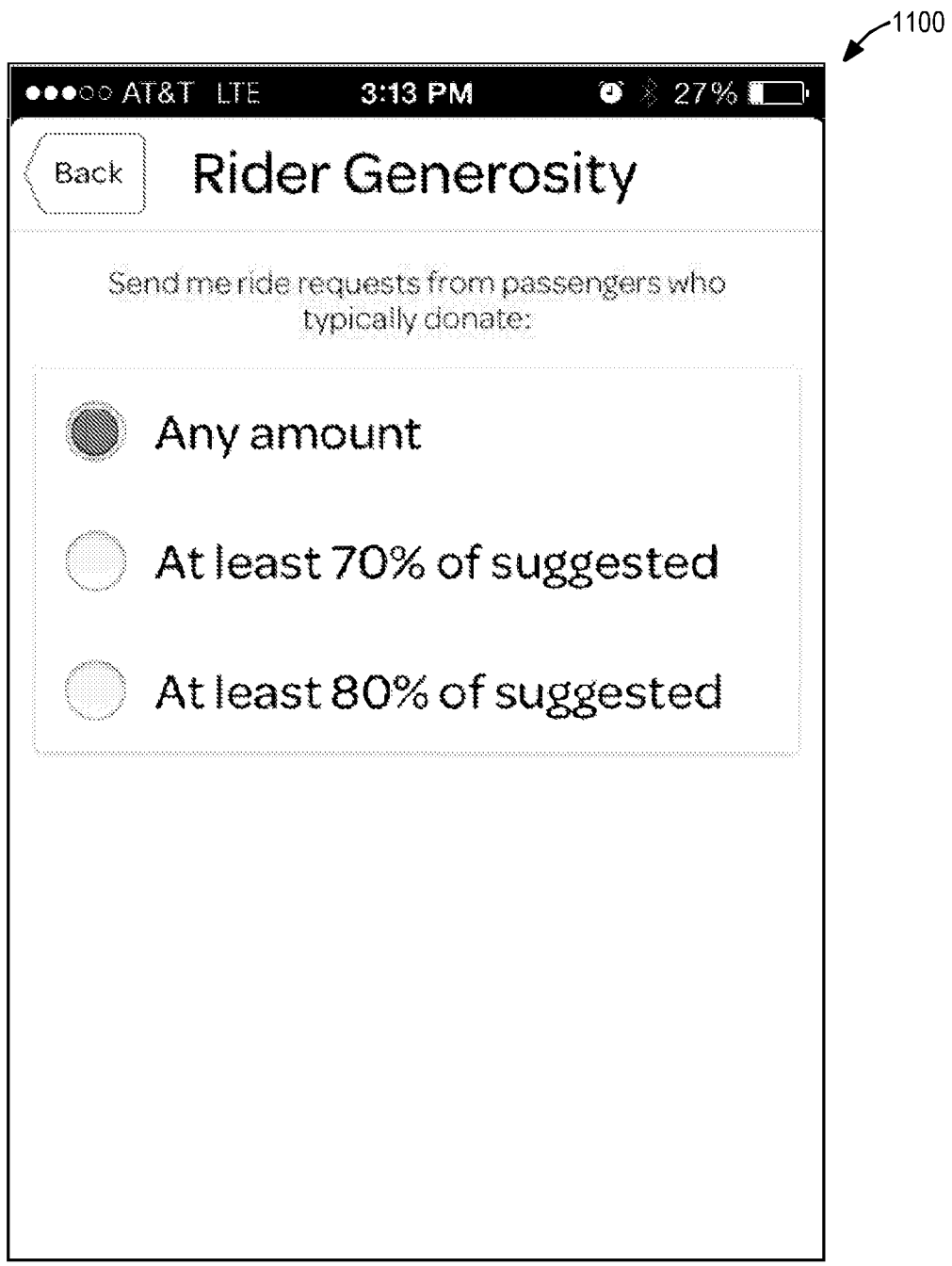

The user interface 700 of FIG. 7 allows a driver to set a particular rider generosity setting such that the driver will receive requests from passengers who typically donate a particular amount of money. FIG. 11 shows an example user interface 1100 for specifying a particular amount that a passenger typically donates. As shown in FIG. 11, the driver has selected "Any amount" to be used for the "Rider Generosity" setting of FIG. 7.

Figure 12:
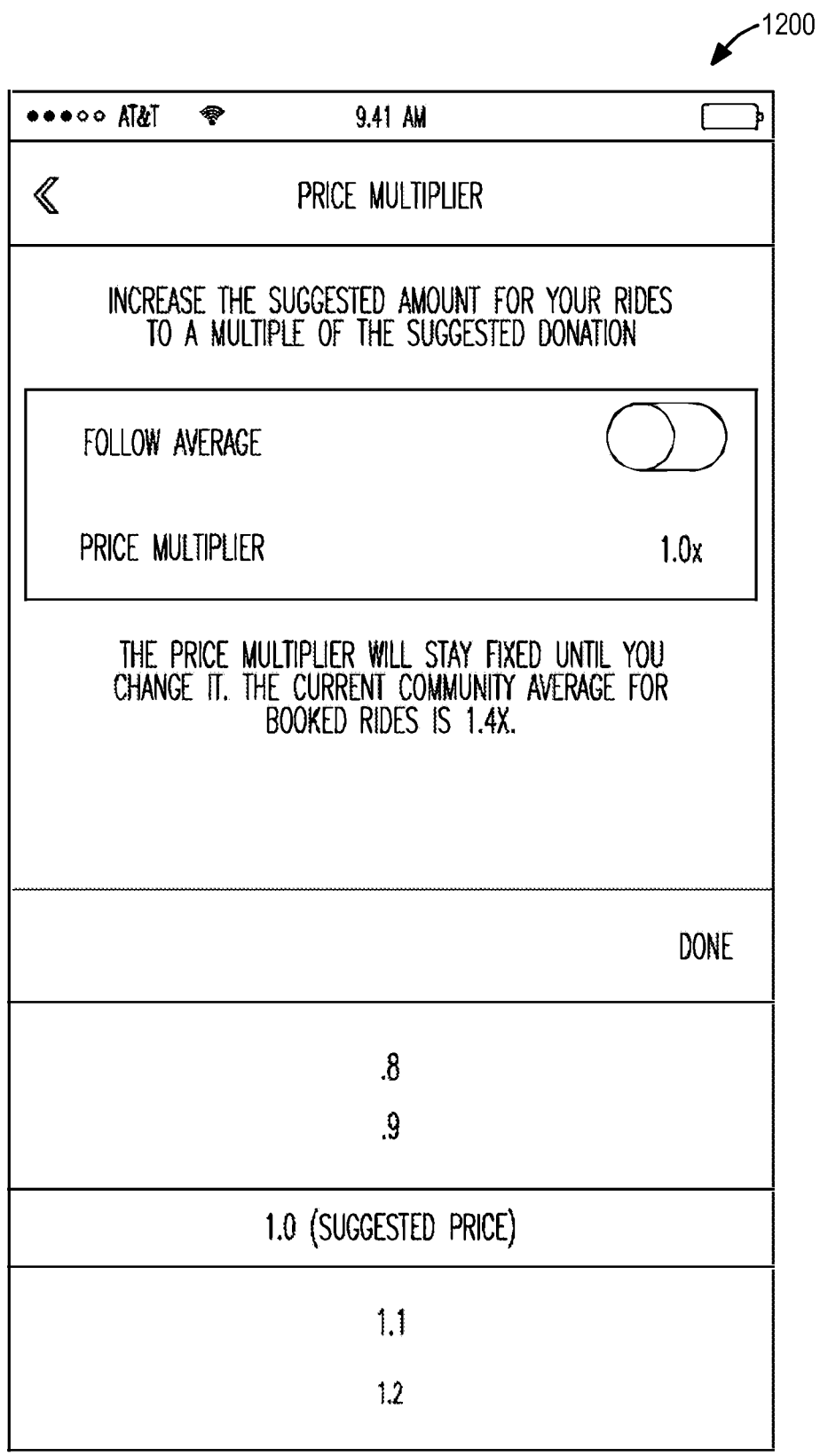

In FIG. 12, a user interface 1200 allows a driver to specify a particular price multiplier to be used based on a price suggested by the transportation server 104 for a particular route. This allows a driver to charge more or less than the price suggested by the transportation server 104. For example, on a Saturday night, the demand for transportation may be higher, and the driver may set a price multiplier of 1.5 such that the driver will charge 1.5 times the price (or calculated fare) suggested by the transportation server 104 since the driver feels that there is enough demand to satisfy this price. In another example, there may be less demand for transportation during the weekday, so a driver may set a multiplier of 0.8 such that the driver may charge 0.8 times the price (or calculated fare) suggested by the transportation server 104 since the driver would like to be competitive with his pricing. In some embodiments, the user interface 1200 also allows a driver to select to follow the average pricing of the driver community for a particular day and/or time of day. For example, if other drivers tend to charge less in the middle of a weekday, a driver automatically follows the average price charged by drivers by selecting the "Follow Average" setting. In some embodiments, this setting provides drivers with feedback on their price versus the current market prices by displaying the average price for recent and/or nearby booked rides. As shown in FIG. 12, the driver has currently selected a price multiplier of 1.0. The price multiplier of 1.0 will then be used for the "Rider Generosity" setting of FIG. 7.

Figure 13:
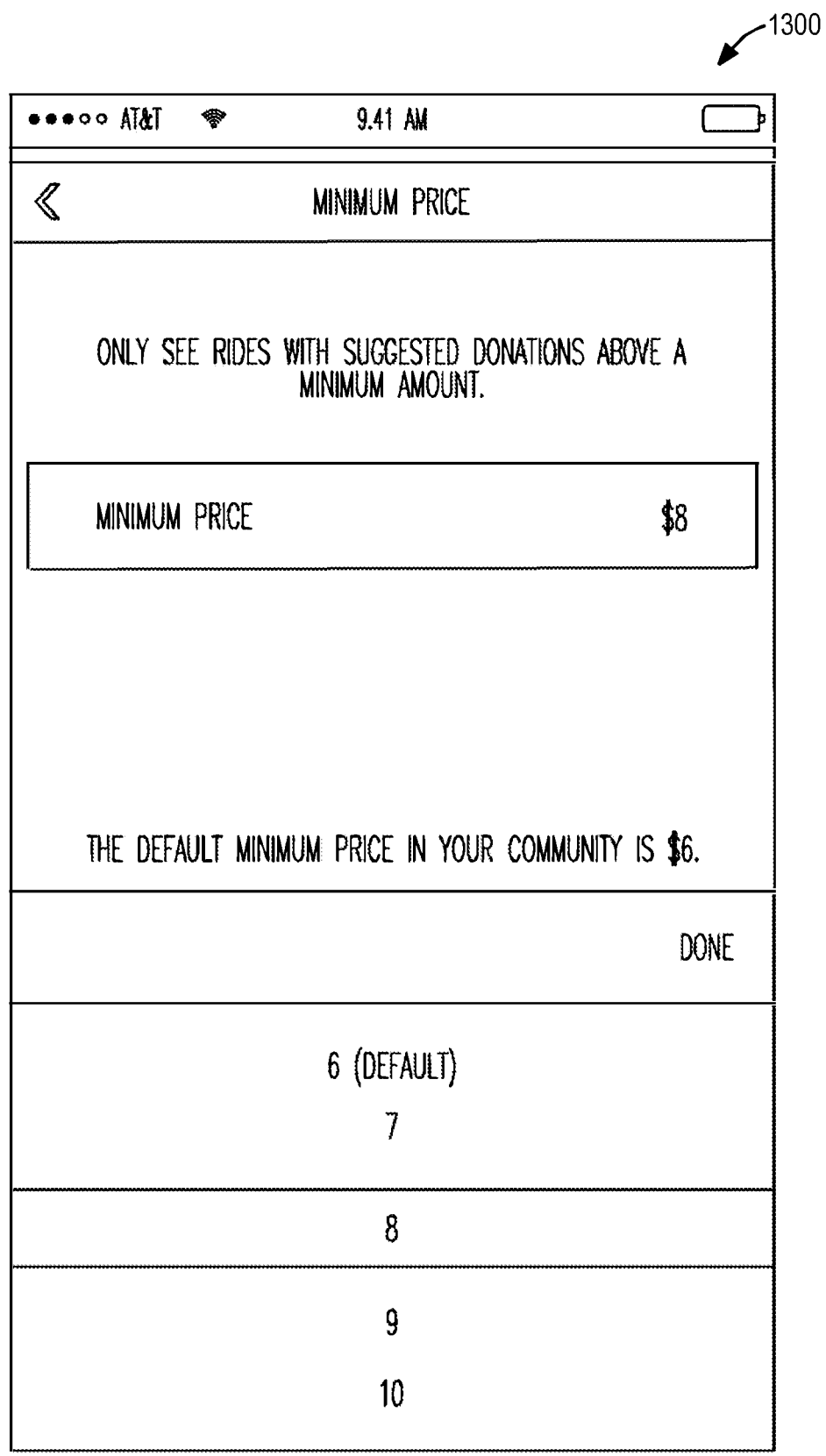

In FIG. 13, a user interface 1300 allows a driver to set a minimum price setting such that the driver will be sent requests, by the transportation server 104, from passengers for routes with a particular minimum price suggested by the transportation server 104. In some embodiments, this setting allows a driver to take the greater of the calculated price or the minimum price. As shown in FIG. 13, the driver has currently selected a minimum price setting to be $8.00. However, it is understood that the driver may select the minimum price setting to be any price amount.

Figure 14:
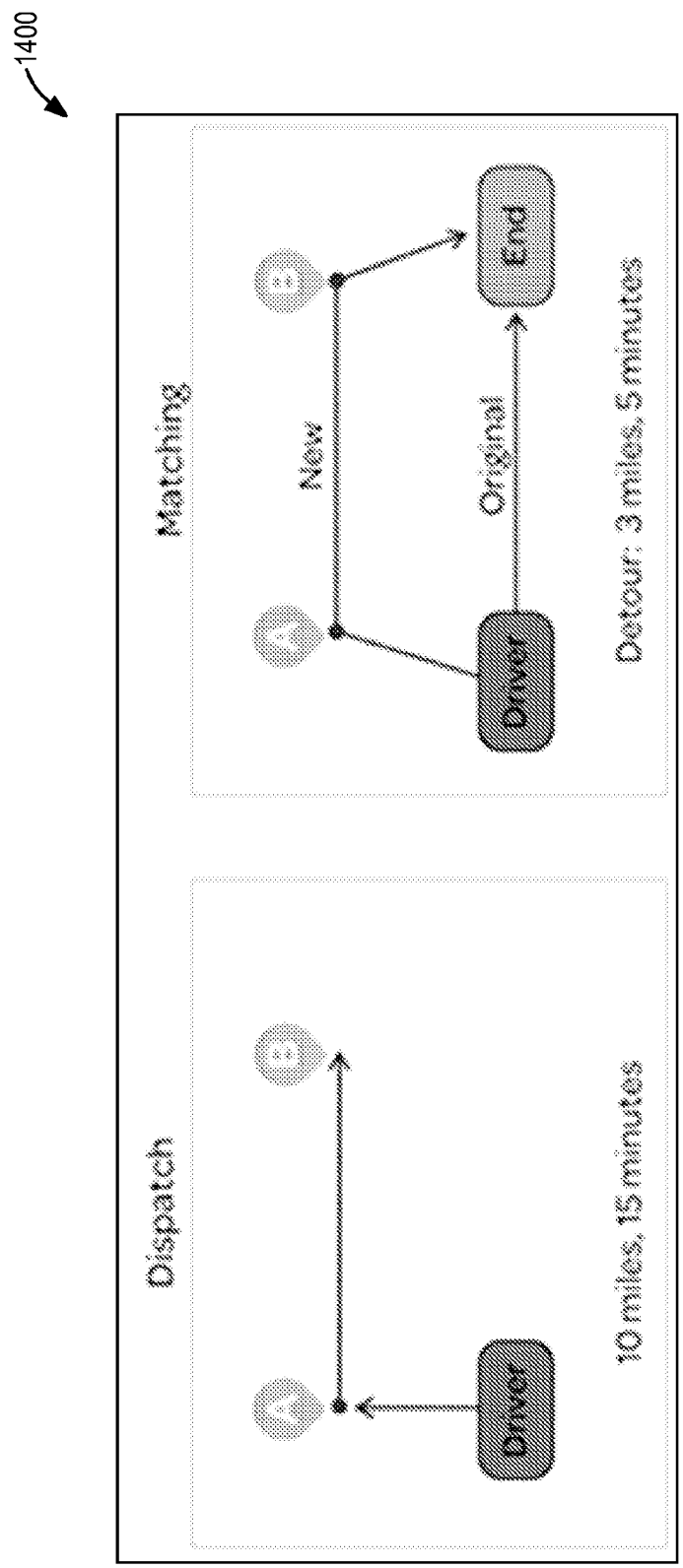

In FIG. 14, a schematic diagram 1400 illustrates a detour pricing feature. For example, when a driver has set a specific destination, the price for the destination is calculated by the transportation server 104 based on a detour from the driver's original route. For example, according to a "Dispatch" pricing model, if the route dispatched to the driver indicates going from point A to point B, which would be a 10 mile route that would take approximately 15 minutes, detour pricing can instead be used to decrease the cost of a route while increasing the convenience to the driver by starting and ending closer to the driver's current path (e.g., detour route of 3 miles that would take approximately 5 minutes).

Such detour pricing can be determined according to a "Matching" pricing model. In some embodiments of the "Matching" pricing model, the driver indicates an intended destination (or drop-off area). That is, the driver is currently traveling towards the intended destination. The transportation server 104 determines a projected original route from the driver's current location to the driver's intended destination.

The transportation server 104 receives a transportation service request from a potential passenger who wants to travel from a pick-up location A to drop-off location B. The transportation server 104 determines a projected new route from the driver's current location to pick-up location A, to drop-off location B and then to the driver's intended destination. The transportation server 104 compares the projected original route and the projected new route and determines that the projected new route includes a detour of 3 miles, from the projected original route, which will require an extra 5 minutes of travel time. The transportation server 104 calculates a fare for the potential passenger based on the detour. For example, the fare will be based on the detour mileage (3 miles), a mileage rate, the detour time (5 minutes) and a time rate.

Figure 15:
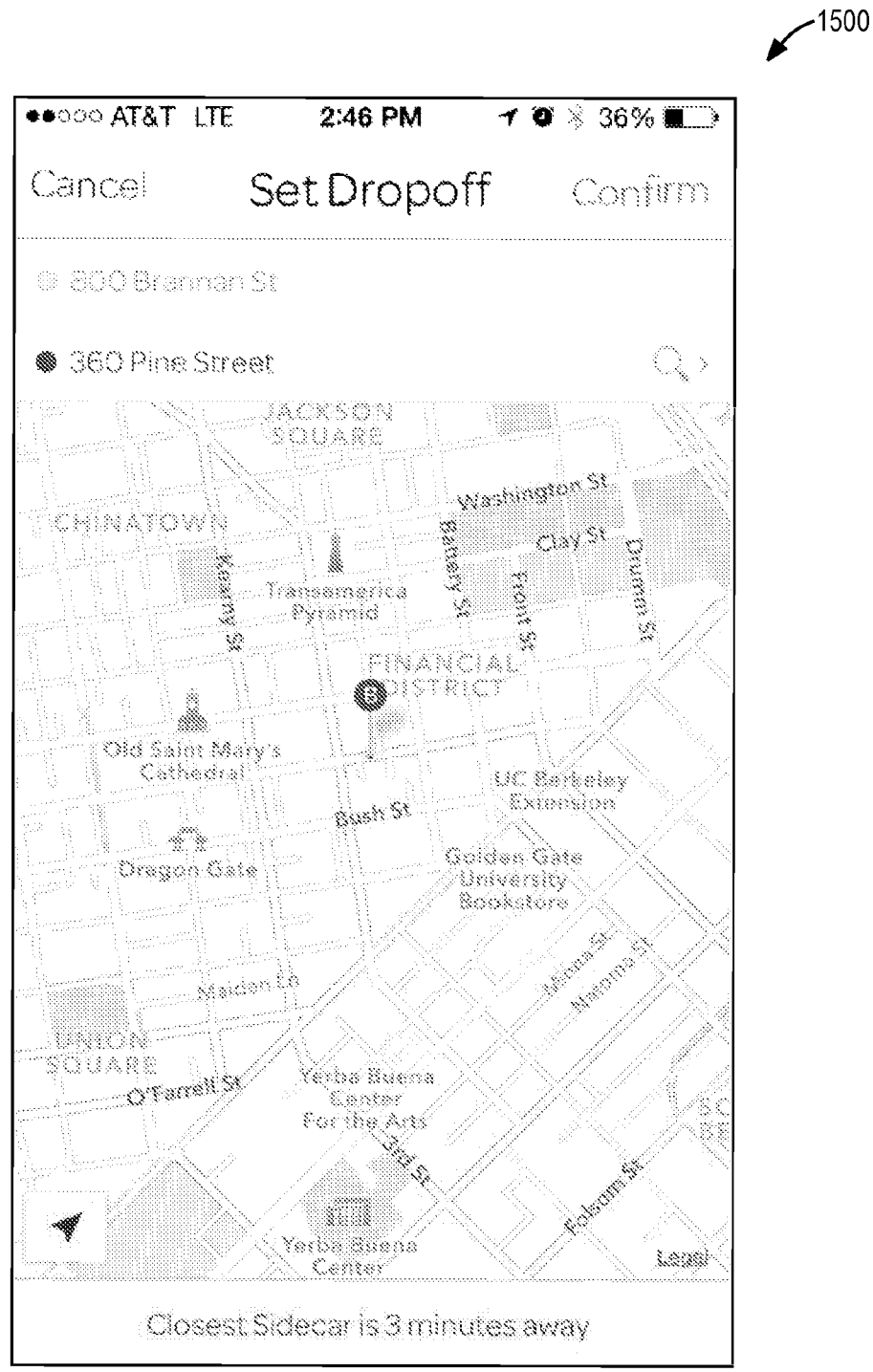

In FIG. 15, a user interface 1500 of a passenger application 350 allows a passenger to set a drop-off location at the location at which the passenger would like to be dropped off upon completion of a booked transportation service. In some embodiments, a passenger also sets a pickup location at which the passenger would like to be picked up at the beginning of a booked transportation service. In some embodiments, the pickup location and/or drop-off location are automatically set using predictive determination based on any suitable factors, such as a history of pickup location, a history of drop-off locations, points of interest, GPS strength, and the like. As shown in FIG. 15, the drop-off location is current set to "360 Pine Street," which is represented by a pin labeled "B" displayed within a graphical map.

Figure 16:
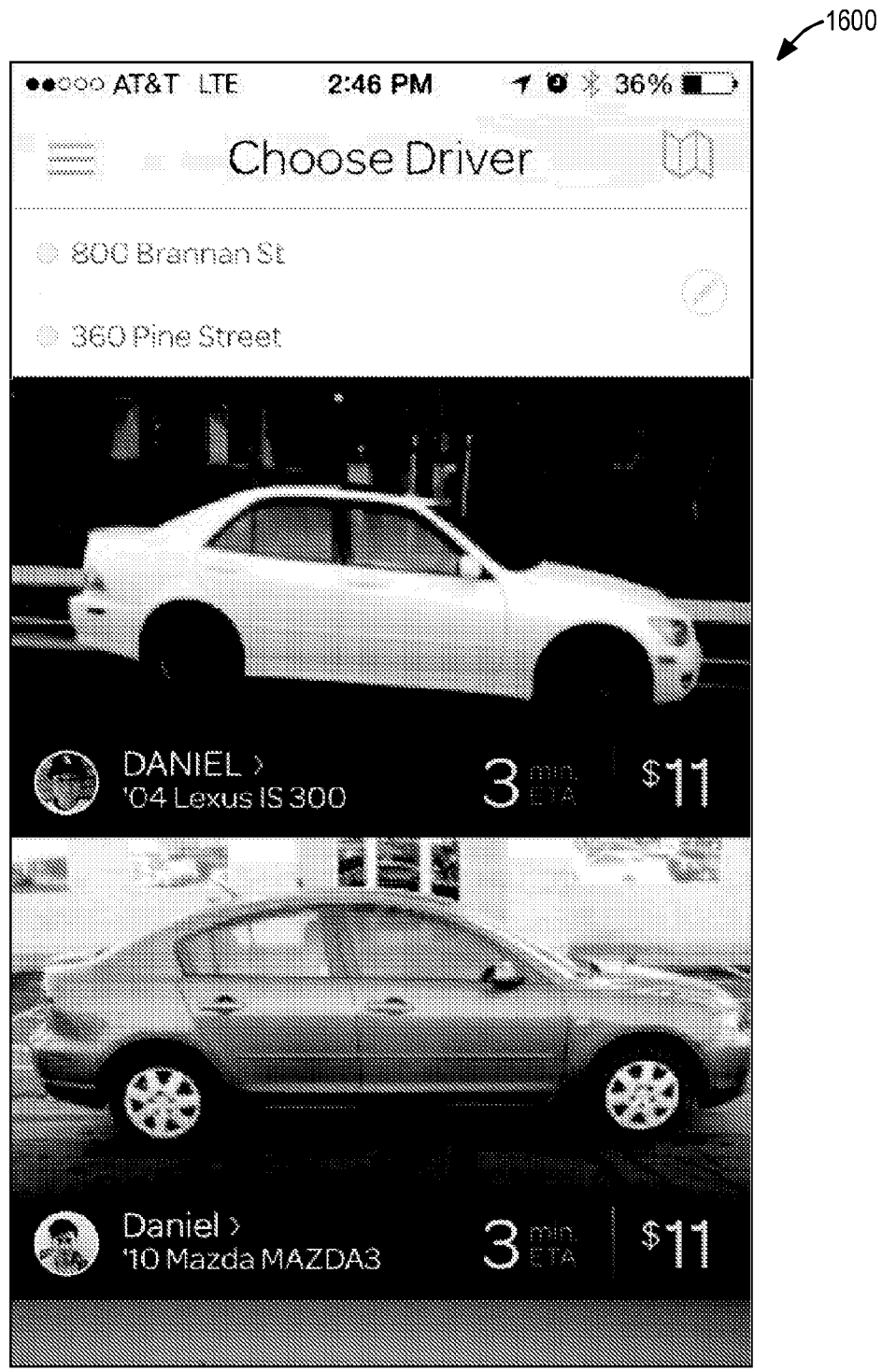

In FIG. 16, a user interface 1600 of a passenger application 350 shows a list of available drivers that are available to accommodate the request for transportation from a particular pickup location to a particular drop-off location. The list of available drivers indicates any information about each driver, such as vehicle type (make, model, year, etc.), an estimated arrival time ("ETA") of the driver based on the driver's location at the time of the request, a suggested price for the particular transportation requested based on characteristics of the trip, a driver's rating, driver's settings (or preferences) and the like.

In some embodiments, a list of soon-to-be-available drivers is provided to a passenger requesting transportation. The list of soon-to-be-available drivers is shown with a price associated with the trip, an estimated time of arrival, and the like. A soon-to-be-available driver is a driver who is not available when the request from the passenger is sent but is estimated to be available in the near future (e.g., a driver who is currently giving a ride to another passenger and is dropping off the other passenger near the requesting passenger's pickup location).

Figure 17:
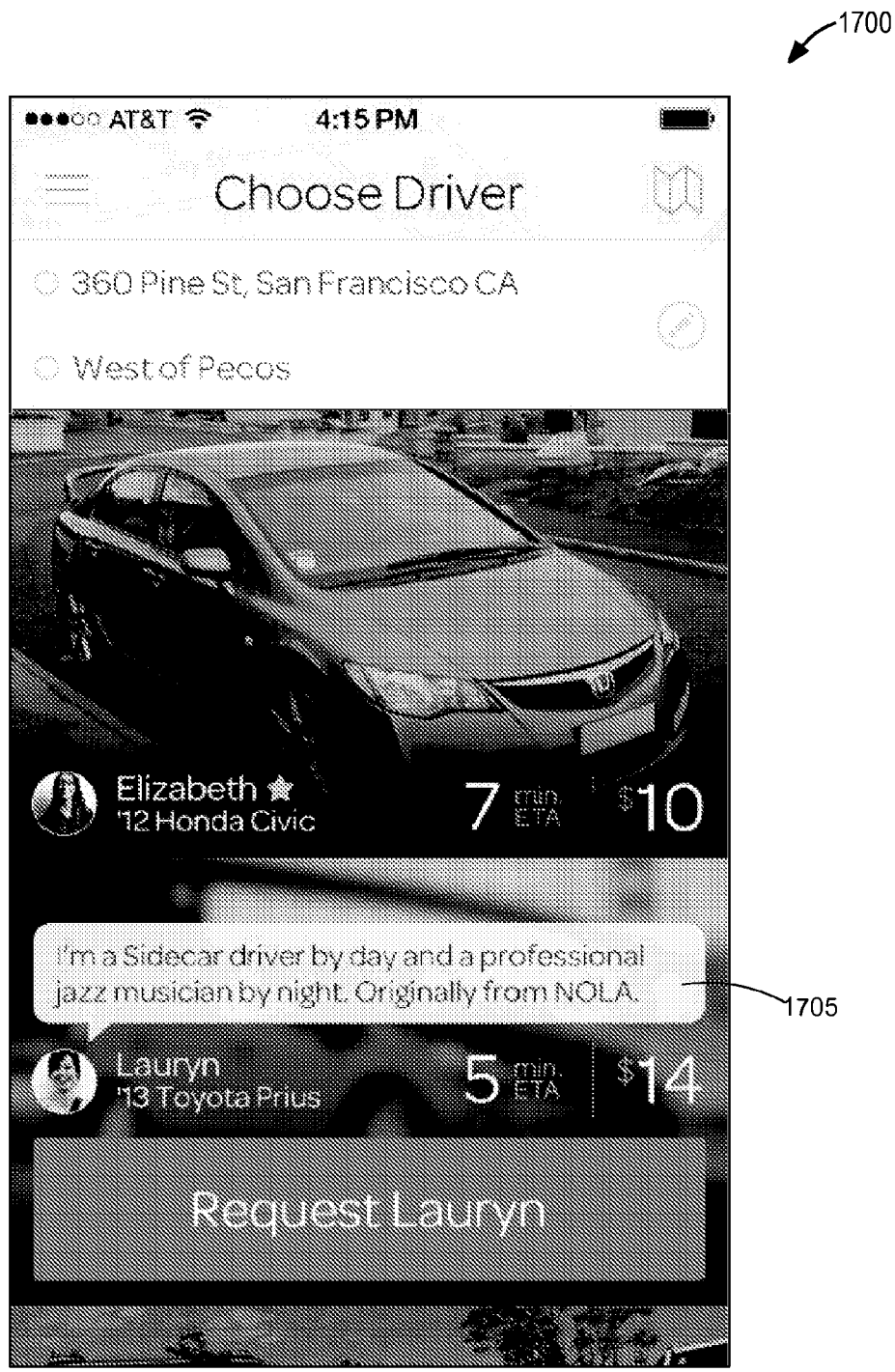

In FIG. 17, a user interface 1700 of a passenger application 350 allows the passenger to scroll down the list of available drivers and select/request a particular driver within the list of drivers using the request button (e.g., "Request Lauryn"). When a driver is chosen from the list, information 1705 about the driver is displayed. Any relevant information about the driver is displayed from a driver's profile.

Figure 18:
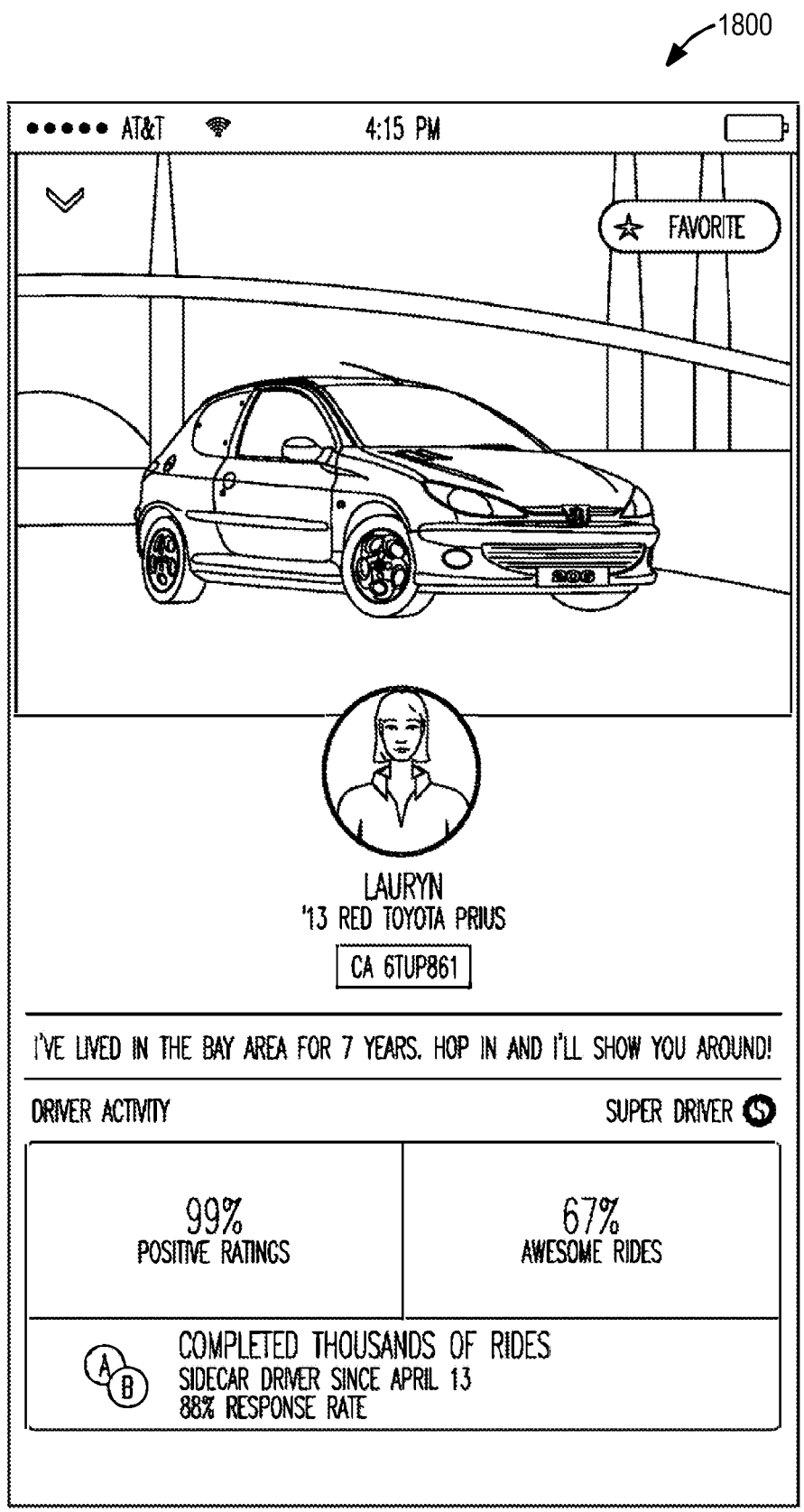

FIG. 18 depicts an example user interface 1800 displaying a driver profile associated with a driver displayed via the passenger application 350. The driver profile displays any information associated with the driver, including the driver's name, the driver's vehicle information, comments provided by the driver, ratings of the driver, driver activity, whether the driver's vehicle includes car seats, the number of seatbelts in the vehicle, and the like. In some embodiments, the information in a driver's profile may be searchable and is presented to a potential passenger in various ways (e.g., in a list of available drivers provided to a passenger requesting transportation).

Figure 19:
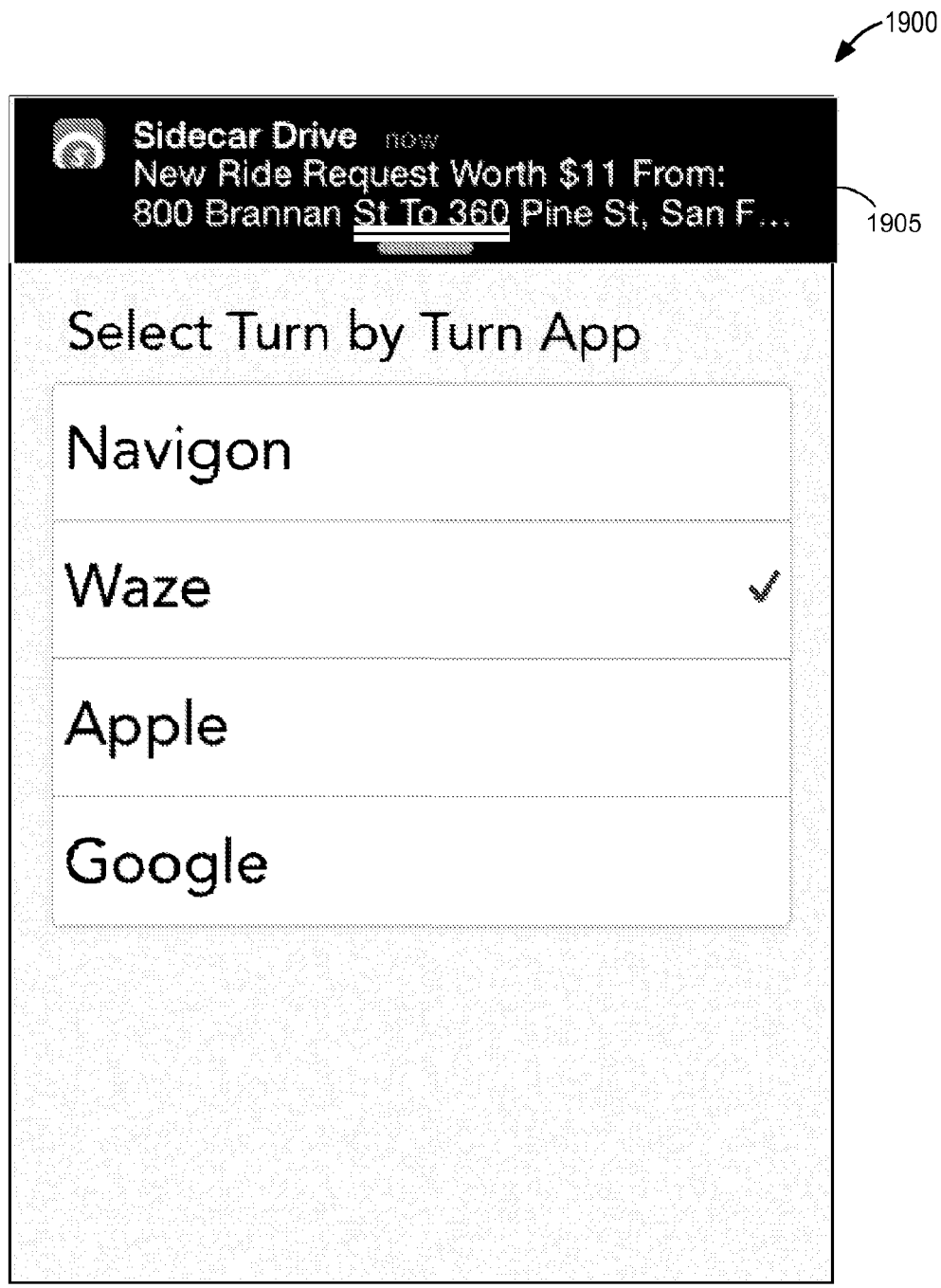

In FIG. 19, a user interface 1900 of a driver application 300 receives a notification 1905 of a request from a passenger. The notification 1905 indicates information about the request, such as the suggested price associated with the request, the pickup location, the requested drop-off location, and the like. In some embodiments, the request is received if the request fulfills the preferences set by the driver in the driver application 300. The notification 1905 appears regardless of which user interface is currently displayed by the driver application 300. As shown in FIG. 19, the notification 1905 appears along with the example user interface for selecting a particular third-party navigation application (as discussed with regard to FIG. 10).

Figure 20:
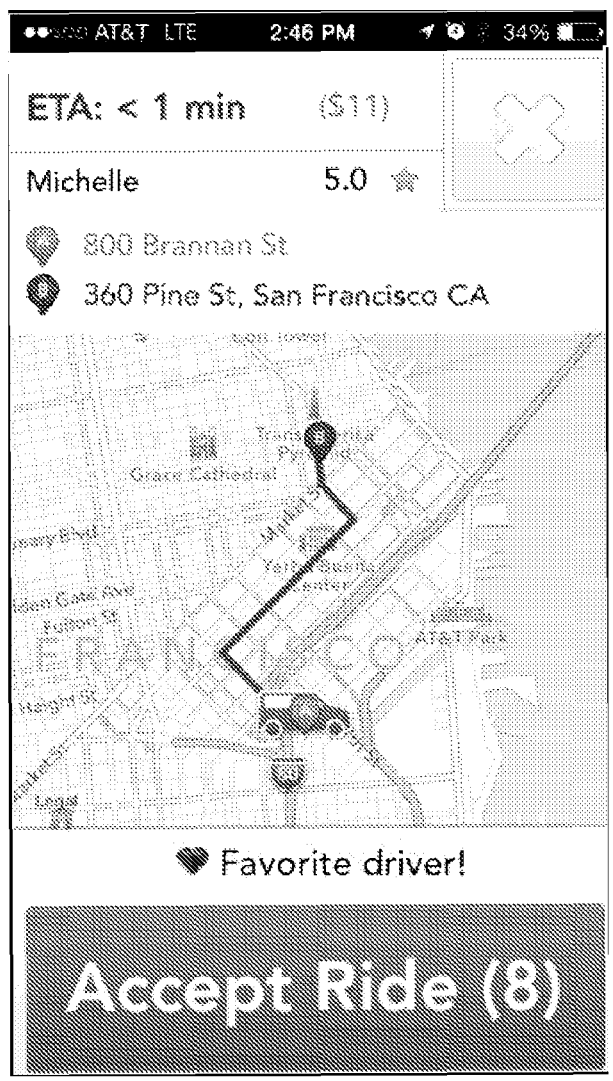

In FIG. 20, a user interface 2000 of the driver application 300 allows a driver to view details about a request received from a passenger. The request is related to notification 1905 and is for a request for a ride from a pick-up location of "800 Brannon St." (represented as label "A" in a graphical map portion of the user interface 2000) to a drop-off location of "360 Pine St., San Francisco, Calif." (represented as label "B" in the graphical map portion of the user interface 2000). If the driver approves of the request and would like to pick up the passenger, the driver indicates acceptance of the request by clicking or tapping on the "Accept Ride" button. The "Accept Ride" button may indicate an amount of time (e.g., 8 seconds) before the request expires and is sent to another driver. The user interface 2000 further indicates that the passenger requesting the ride has selected the driver as a "Favorite Driver"—thereby providing an incentive for the driver to approve the request.

Figure 21:
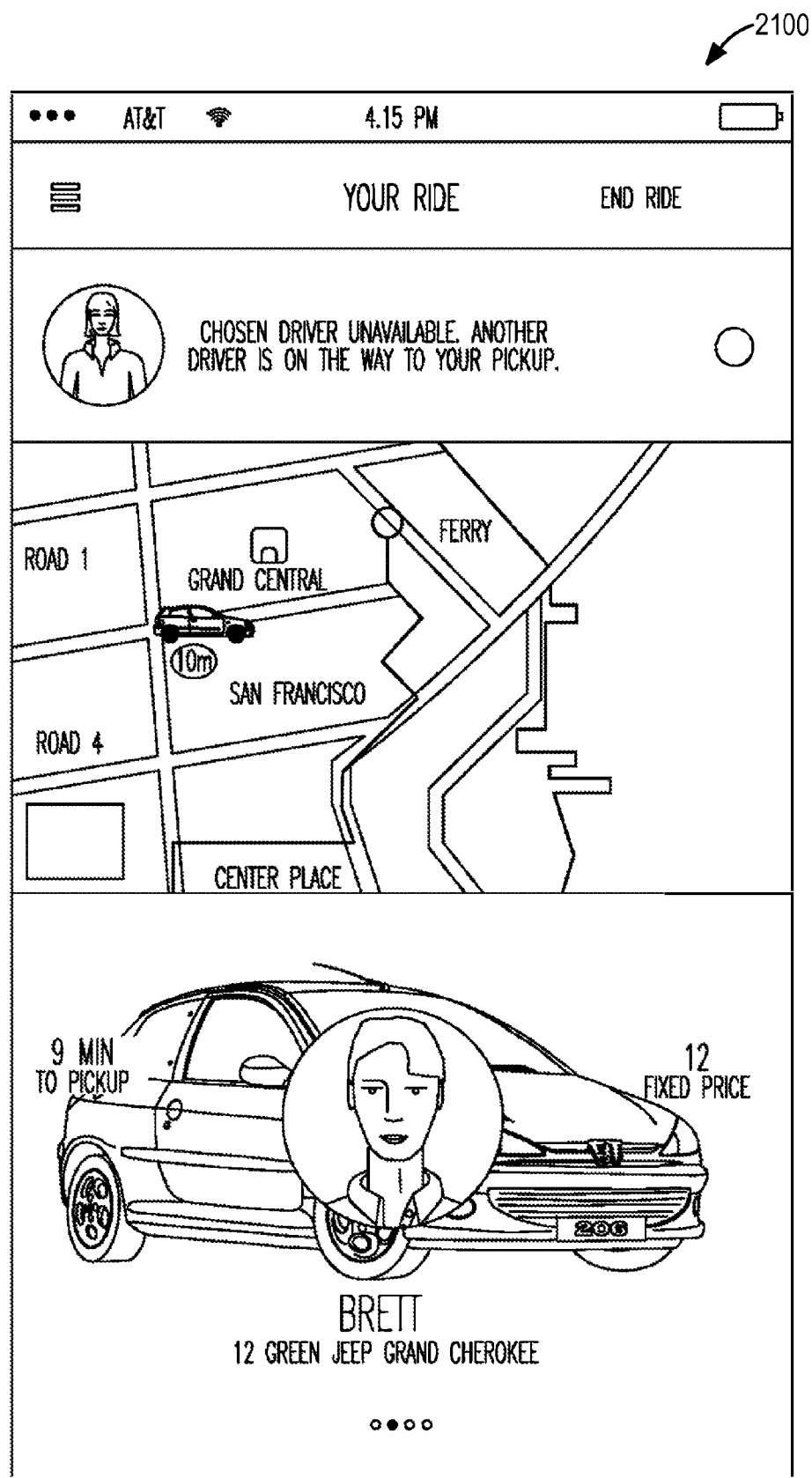

In FIG. 21, if a driver does not accept a request from a passenger, a user interface 2100 of the passenger application 350 is further used to indicate that the driver chosen by the passenger is unavailable to fulfill the request and presents the passenger with a backup driver ("Brett"), along with an amount of time until the backup driver can pick-up the passenger ("9 min") and a price ($12) for a ride from the backup driver. The backup driver is selected for the passenger based on any criteria and/or preferences of the passenger. In some embodiments, the backup driver is selected by the transportation server 104 based on relevancy and/or similarities between the backup driver and the driver originally selected by the passenger.

Figure 22:
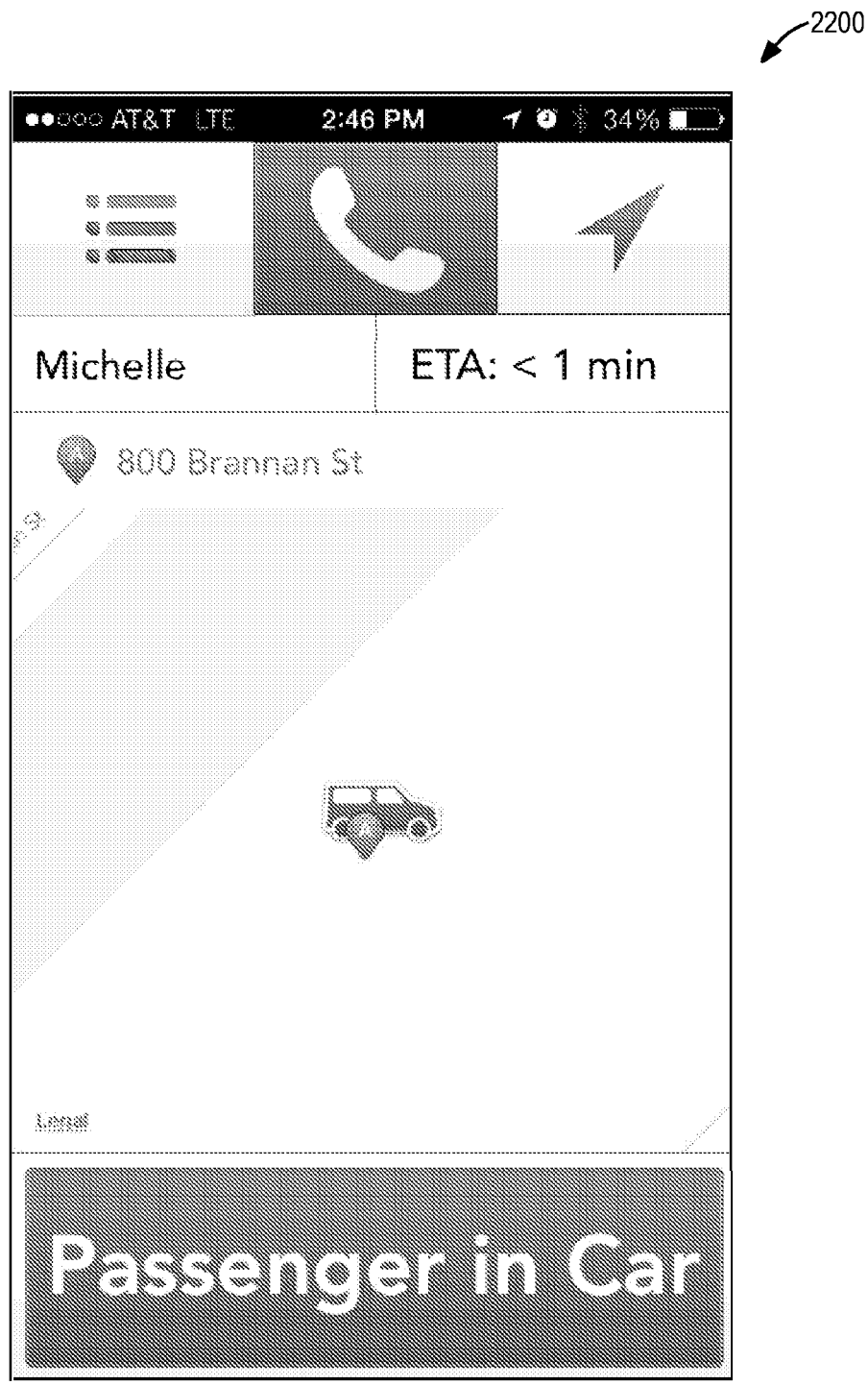
Figure 23:
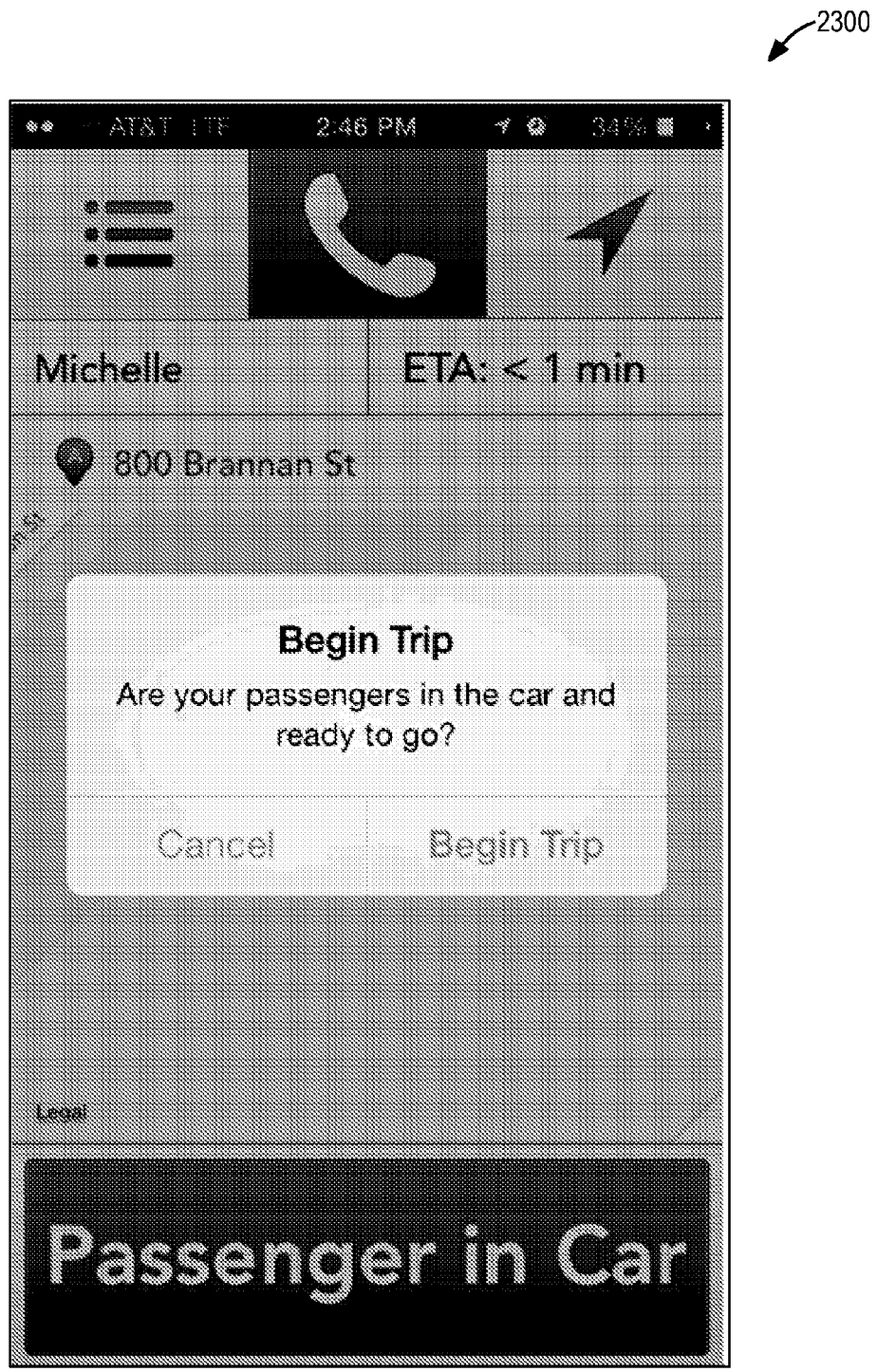

In FIG. 22, if the driver accepts a request from a passenger, a user interface 2200 of the driver application 300 indicates when the requesting passenger is in the vehicle (e.g., has been picked up by the driver at the pick-up location) by clicking or tapping on the "Passenger in Car" button. In FIG. 23, when a driver indicates the passenger is in the car, a user interface 2300 of the driver application 300 indicates that the trip has begun or that the trip should be canceled. Once the trip begins, the driver selects the "Begin Trip" button or can select the "Cancel" button should the driver seek to cancel the trip.

Figure 24:
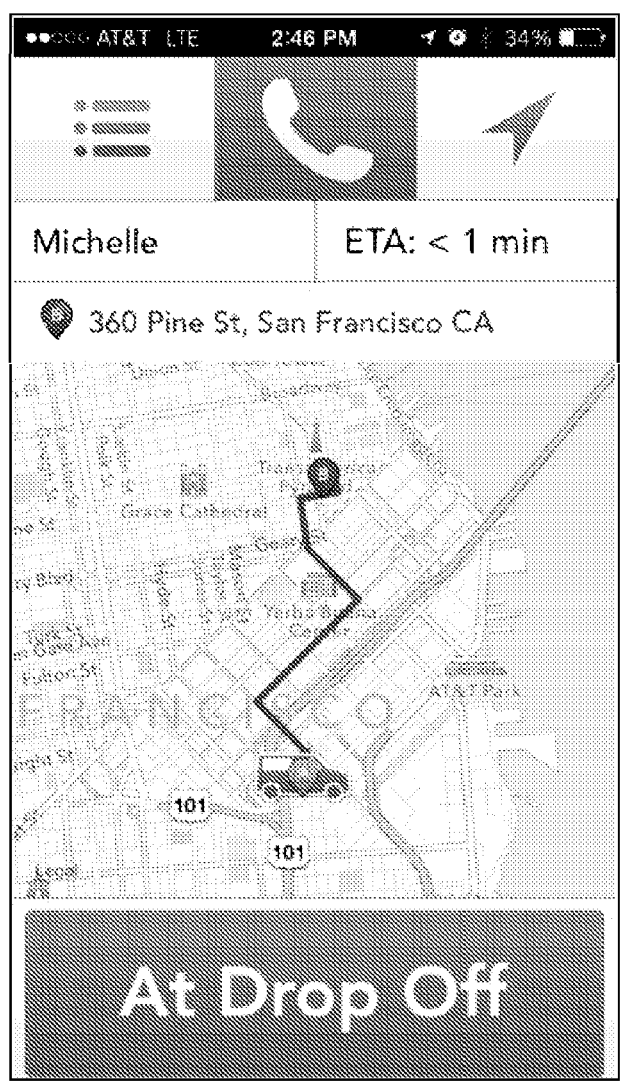

In FIG. 24, a user interface 2400 of the driver application 300 allows a driver to specify when the driver arrives at the passenger's drop-off location (i.e. 360 Pine St.) by clicking or tapping on the "At Drop Off" button on the user interface 2400.

Figure 25:
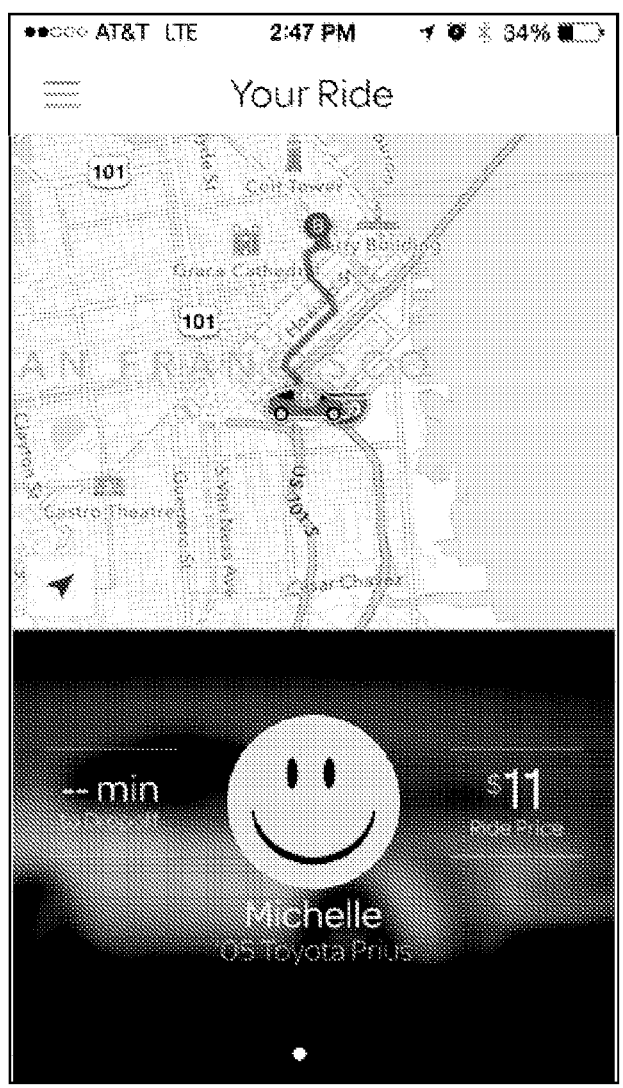

In FIG. 25, a user interface 2500 of the driver application 300 indicates the suggested ride price ($11) to be charged to the passenger. The suggested ride price is calculated by, and received from, the transportation server 104.

Figure 26:
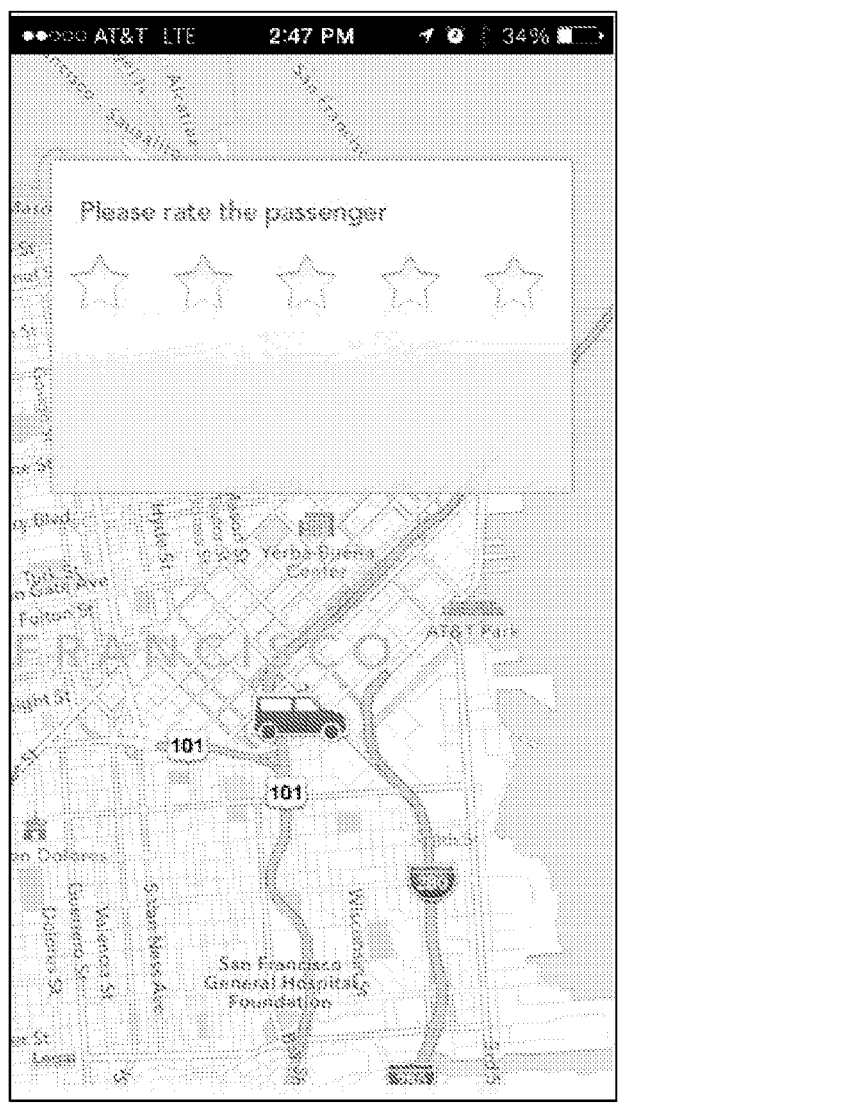

In FIG. 26, a user interface 2600 of the driver application 300 allows a driver to rate a passenger. For example, the driver may wish to rate the passenger based on how much the passenger paid relative to the suggested price, the experience the driver had while driving the passenger, and the like. The transportation server 104 receives the passenger rating and updates a profile of the passenger based on the received passenger rating.

Figure 27:
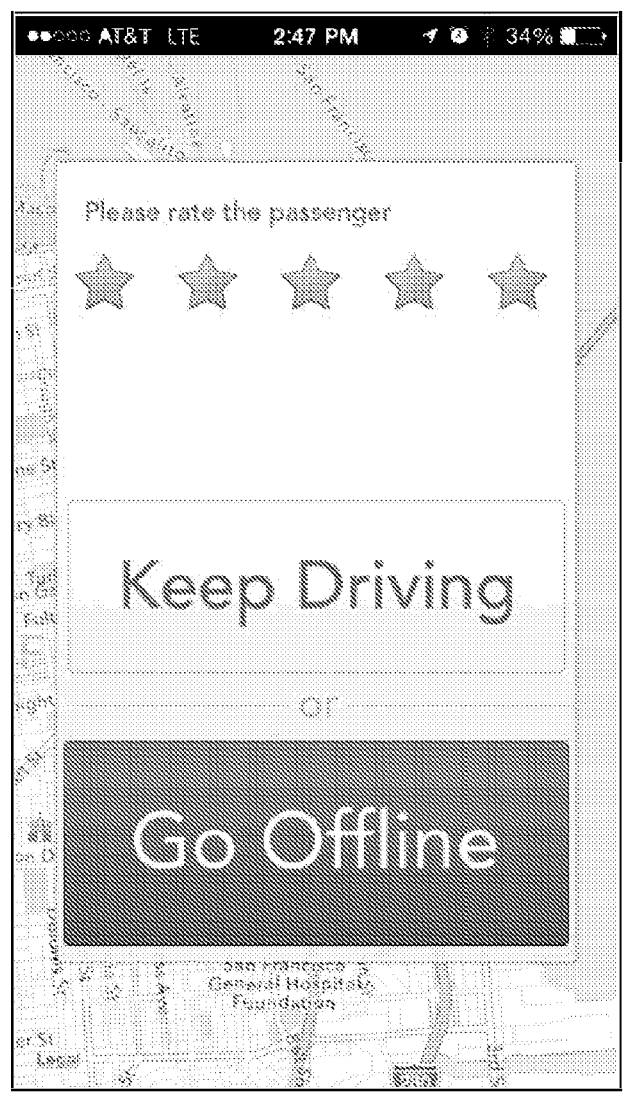

In FIG. 27, a user interface 2700 of the driver application 300 allows a driver to either continue driving and receiving requests from passengers or may go offline such that passenger requests are no longer received. The driver clicks or taps on either of a "Keep Driving" button or a "Go Offline" button in the user interface 2700. The transportation server 104 receives an indication of which button the driver selected.

Figure 28A:
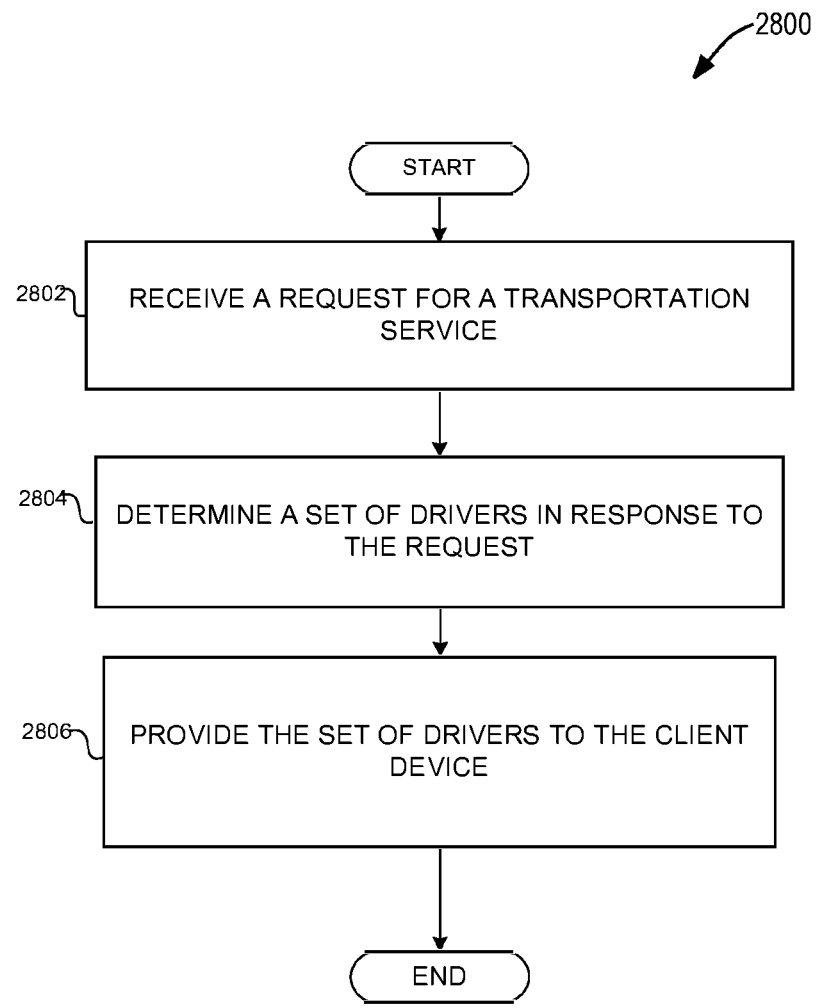
FIG. 28A is a flowchart showing an example method of providing a transportation marketplace, according to some embodiments.

FIG. 28A is a flowchart showing an example method 2800 of providing a transportation marketplace. In operation 2802, a request for a transportation service is received by the transportation server 104 from a client device 108 of a passenger.

In operation 2804, the transportation server 104 determines a set of drivers in response to the request. The set of drivers are drivers that are available and/or willing to fulfill the request (e.g., based on preferences set by the drivers).

In operation 2806, the determined set of drivers is provided to the client device 108 of the passenger such that the passenger selects a particular driver from the set of drivers provided.

Figure 28B:
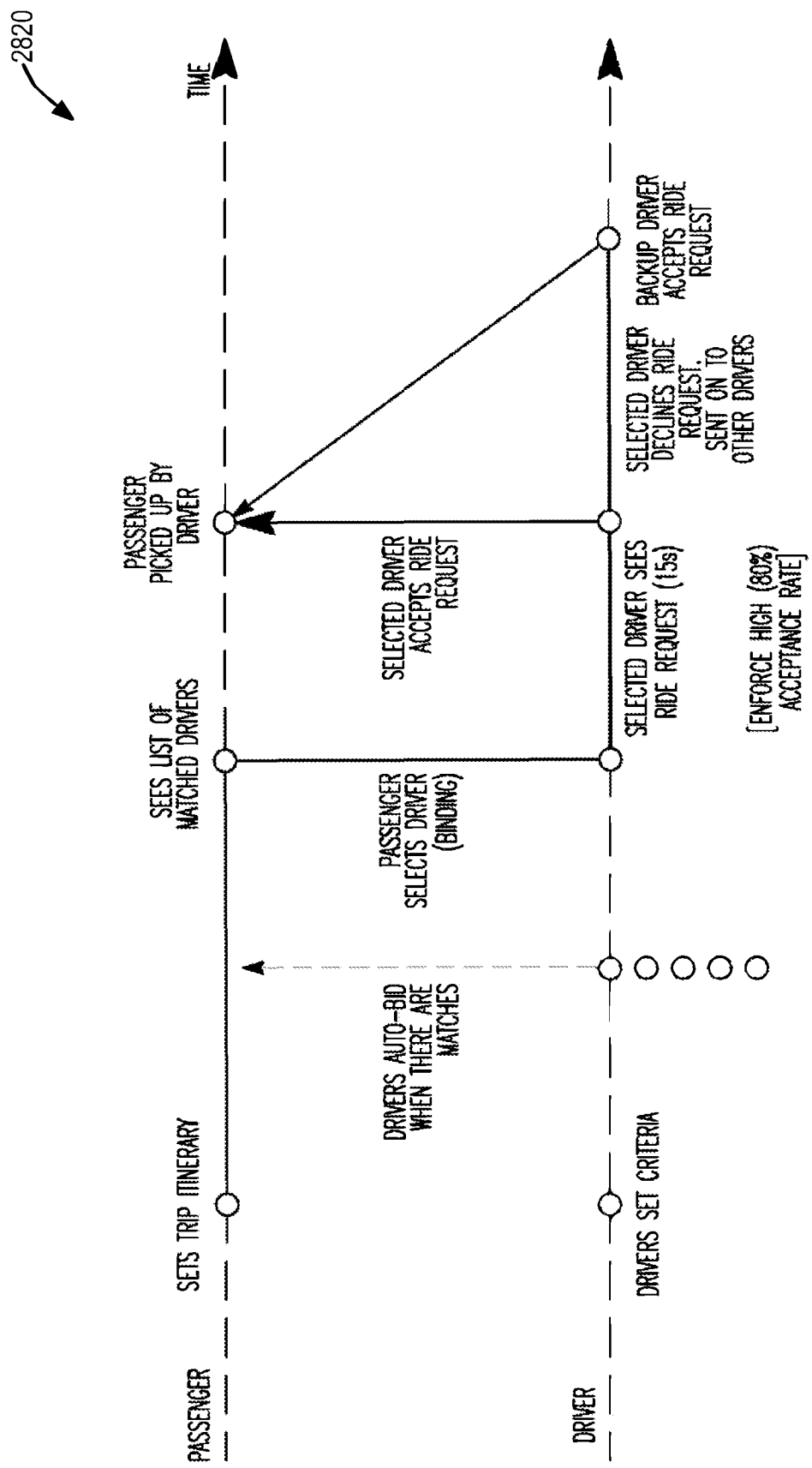
FIGS. 28B-28C are flowcharts showing example methods of responding to a request for transportation.
Figure 28C:
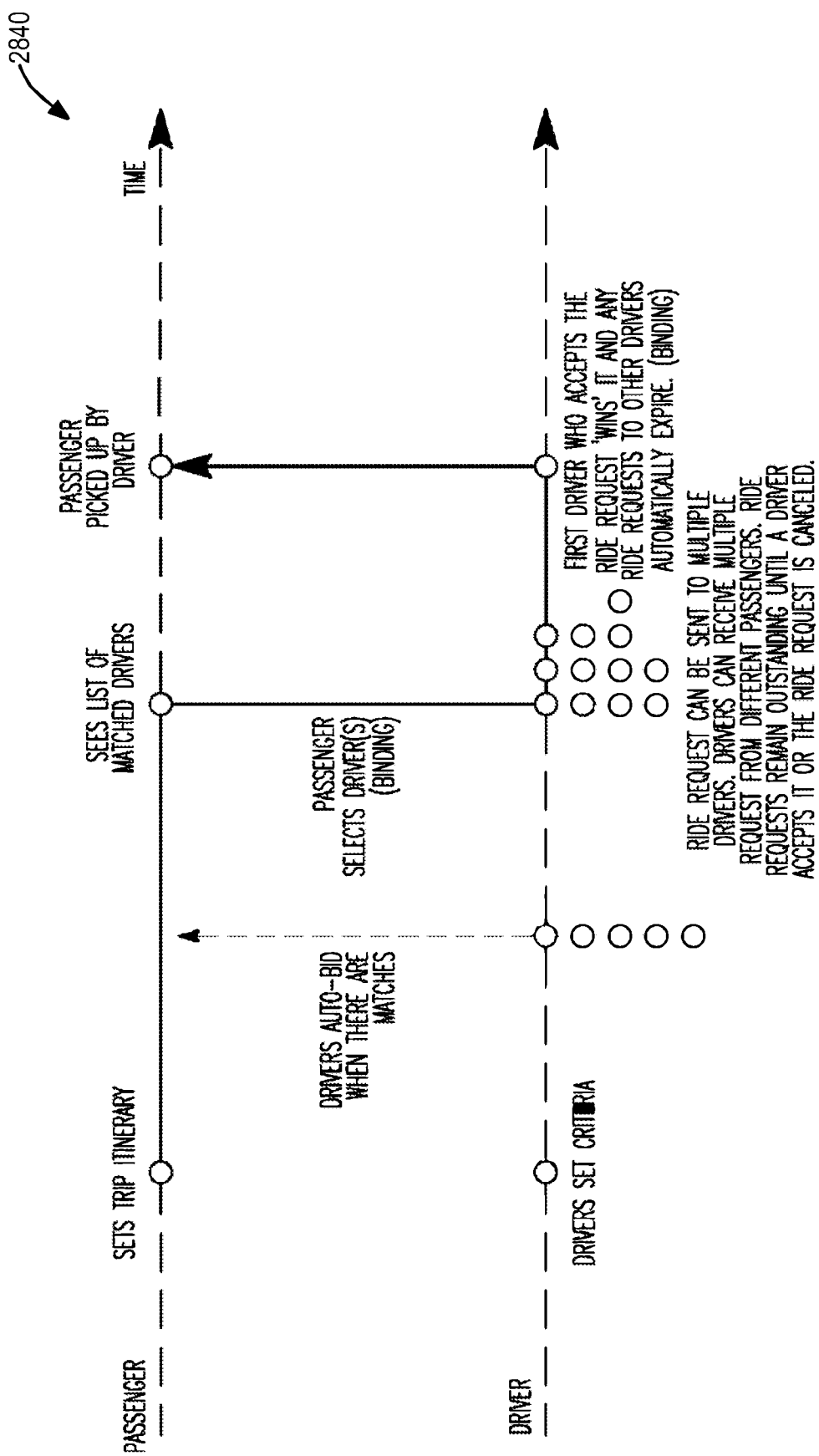

FIGS. 28B-28C are flowcharts showing example methods 2820 and 2840, respectively, of responding to a request for transportation.

As shown in FIG. 28B, according to some embodiments, a passenger requests an itinerary for a ride from a pick-up location to a drop-off location. It is understood that there are one or more available drivers who have set their own personal criteria, settings and/or preferences (as already discussed above.) The transportation server 104 receives the passenger's requested itinerary and scans all drivers that are currently online in the transportation marketplace and compares information about the passenger and the requested itinerary against each driver's respective criteria, settings and/or preferences. The transportation server 104 determines one or more drivers that match the passenger and the requested itinerary.

The transportation server 104 sends a list of one or more matched drivers to the passenger's client device, wherein each matched driver is associated with a suggested price as calculated by the transportation server 104. The list of matched drivers is displayed to the passenger on the client device. The passenger selects a driver from the list of matched drivers and the passenger application sends an identification of the selected driver to the transportation server 104. Based on receipt of the selected driver, the transportation server sets a binding between the passenger and the selected driver.

The transportation server 104 sends a notification to the selected driver's client application indicating the passenger's requested itinerary. The driver's client application displays the notification to the driver and presents the driver with an option to accept or decline the passenger's transportation request. Based on receiving, by the transportation server 104, an indication that the driver has accepted the passenger's transportation request, the transportation server 104 books a ride for the passenger with the accepting driver according to the requested itinerary. Based on receiving, by the transportation server 104, an indication that the driver has declined the passenger's transportation request, the transportation server 104 selects a backup driver from the list of matched drivers and sends a notification to the back-up driver's client application indicating the passenger's requested itinerary. The transportation server 104 receives an indication that the back-up driver has accepted the passenger's request and the transportation server 104 books a ride for the passenger with the back-up driver according to the requested itinerary.

As shown in FIG. 28C, according to some embodiments, a passenger can select multiple drivers from a list of matched drivers displayed by the passenger's client application. The transportation server 104 receives an indication of each respective selected driver and sends a notification of the passenger's requested itinerary to each selected driver. Additionally, each driver can also be currently receiving requests from other passengers. Based on receiving a first (i.e. earliest) acceptance of the passenger's request from a driver, the transportation server 104 books a ride for the passenger with the accepting driver according to the requested itinerary.

In some embodiments, rather than base the price of a transportation request on the route from the pickup location to the drop-off location, the price is based on the route from the driver starting point (e.g., where the driver accepts the transportation request) to the pickup location and then to the drop-off location in order to compensate the driver while they are en-route to pick up the passenger. For example, driver A can pick up passenger B, then pick up passenger C, then drop off passenger C, then drop off passenger B, and the price of the trip can be allocated between passenger B and passenger C based on the distance, cost of the ride, and the like.

In some embodiments, transportation requests are automatically filtered by the transportation server 104 to show requests that are compatible with a driver's start time, start location, desired end time, desired end location, and the like. For example, the driver indicates that the driver will be heading home from work at 6:00 pm and is willing to give a ride to someone as long as the driver will arrive at home by 7:30 pm. Pricing for the ride can be calculated according to the "Matching" pricing model as discussed with regard to FIG. 14.

In some embodiments, information from drivers and passengers is used to automatically match drivers and passengers based on compatibility of schedules of the drivers and passengers (e.g., based on desired pickup time, pickup location, drop-off location, and the like). This allows for rides to be automatically scheduled based on compatibility. In some embodiments, the scheduling features factor in the passenger's desired end time to match drivers with multiple passengers fulfilling request criteria such that a driver may take several passengers at once from multiple pickup locations.

In some embodiments, a passenger and/or a driver filter their requests to limit the requests to certain groups (e.g., employees of a particular company, friends connected through a social media website, etc.).

In some embodiments, the services provided by the transportation server 104 are integrated with other third party aggregators showing transportation results (e.g., public transportation websites, map websites, etc.). In some embodiments, information from these third party aggregators is incorporated into results (e.g., list of available drivers) provided by the transportation server 104.

In some embodiments, drivers and/or passengers are rated based on a dual-level rating that provides a primary and a secondary rating. The dual-level rating is used to rank drivers and/or passengers accordingly within a search result.

In some embodiments, drivers and/or passengers are ranked on a dual-level ranking. For example, a driver and/or passenger is automatically warned of a possible termination of their account based on past or current activities and will subsequently have their account terminated based on continued behavior. In another example, a driver and/or passenger is automatically rewarded and acknowledged based on their behavior.

In some embodiments, a passenger specifies which drivers have been their favorite drivers based on past experiences with those drivers, and/or a driver specifies which passengers have been their favorites based on past experiences with those passengers. In some embodiments, a list of available drivers is provided to a passenger requesting transportation based on the passenger's favorite drivers. For example, the list is sorted based on available favorite drivers and may or may not provide other drivers that are not favorite drivers of the passenger. This can also be similarly be performed for a driver's favorite passengers, which may be useful for occurrences such as commuting, events, and the like. In some embodiments, a passenger is shown a list of their favorite drivers in response to the passenger entering a promotional code or a special link. In some embodiments, a passenger enters a code while in transit with a particular driver, which results in the particular driver automatically being specified as one of the passenger's favorite drivers. This also results in an automatic change in economic transactions (e.g., zero take rate).

In some embodiments, specifying a driver and/or passenger as a favorite driver and/or passenger results in allowing access to a communication channel between the passenger and the driver. For example, when a passenger and/or driver specifies a favorite driver and/or passenger, the passenger and/or driver is allowed to communicate with the driver and/or passenger in any suitable manner (e.g., text message, instant message, telephone call, email, etc.). In some embodiments, a driver and/or a passenger choose to follow or friend another driver and/or passenger, which provides access to any suitable communication channel. In some embodiments, the indication of a favorite driver and/or passenger is displayed on a driver and/or passenger's profile and viewable by other drivers and/or passengers. In some embodiments, being a favorite driver and/or passenger results in a reward (e.g., monetary, credits, discounts, etc.). In some embodiments, a list of a driver and/or passenger's favorites is adopted by other drivers and/or passengers so that the favorite drivers and/or passengers are added to their own list of favorites. In some embodiments, a group of drivers and/or passengers are collectively added to a list of favorites in any suitable manner (e.g., using a code, identifier, URL, etc.). The group of drivers and/or passengers may be any group of drivers and/or passengers having any affiliations or similarities (e.g., based on an associated company, rating, location, etc.).

In some embodiments, a specific driver who a passenger has previously ridden with, or who has been recommended to the passenger though social interaction with the passenger, is selected as a driver for the passenger. In some embodiments, the specific driver is used as a backup driver in the event a selected driver is unavailable.

In some embodiments, GPS is used to co-locate a driver and passenger and automatically associate the two or more parties to allow activities like favoriting, payment, and ratings. This allows for the initiation of a game, social activity, or other activity. This includes looking for GPS/location-aware updates that travel a distance together to create the association.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 29:
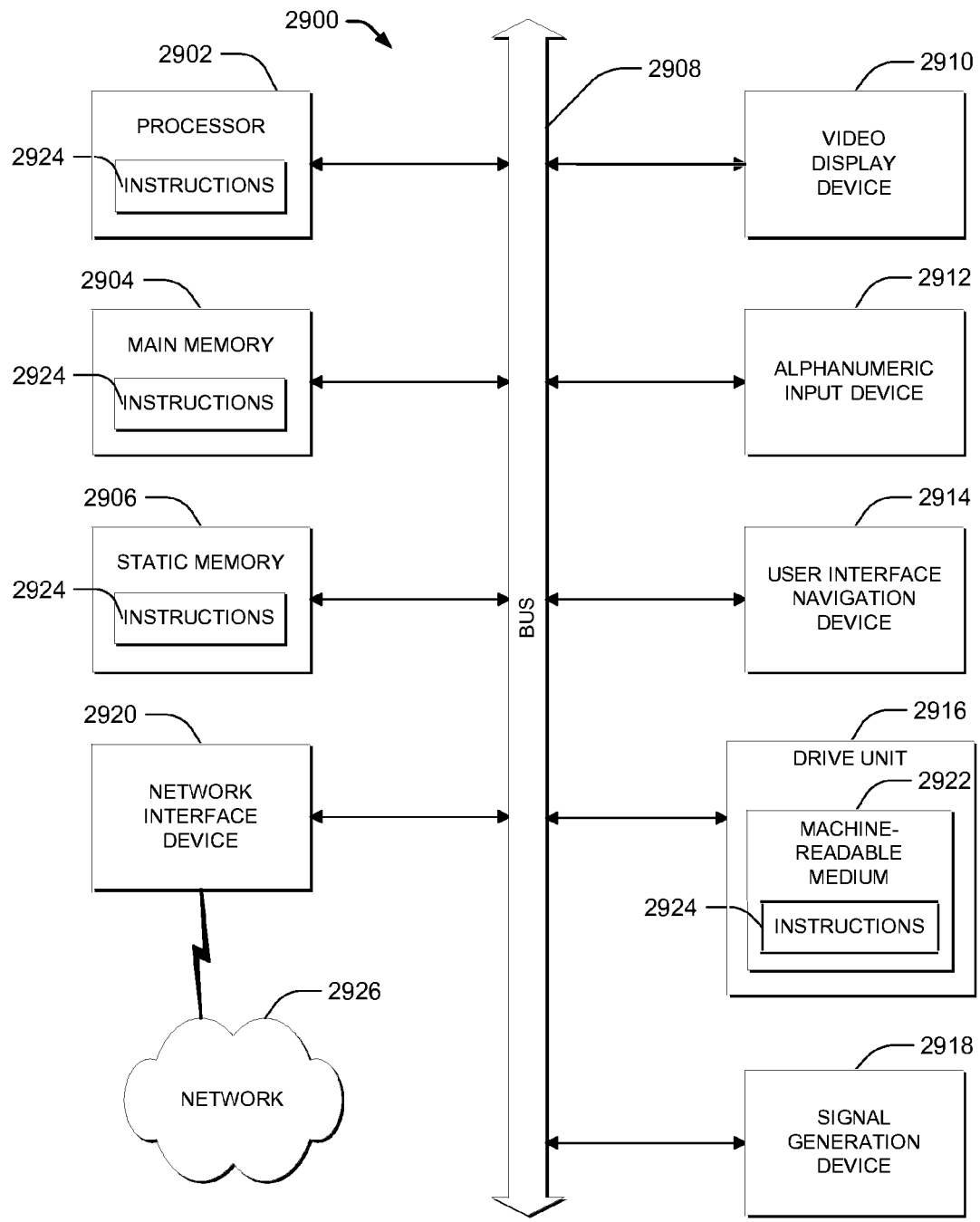
FIG. 29 is a block diagram of a machine in the example form of a computer system within which a set of instructions, for causing the machine to perform any one or more of the methodologies discussed herein, may be executed, according to some embodiments.

FIG. 29 is a block diagram of a machine in the example form of a computer system 2900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 2900 includes a processor 2902 (e.g., a central processing unit (CPU), a graphics processing unit (GPU) or both), a main memory 2904, and a static memory 2906, which communicate with each other via a bus 2908. Computer system 2900 may further include a video display device 2910 (e.g., a liquid crystal display (LCD) or a cathode ray tube (CRT)). Computer system 2900 also includes an alphanumeric input device 2912 (e.g., a keyboard), a user interface (UI) navigation device 2914 (e.g., a mouse or touch sensitive display), a disk drive unit 2916, a signal generation device 2918 (e.g., a speaker) and a network interface device 2920.

Disk drive unit 2916 includes a machine-readable medium 2922 on which is stored one or more sets of instructions and data structures (e.g., software) 2924 embodying or utilized by any one or more of the methodologies or functions described herein. Instructions 2924 may also reside, completely or at least partially, within main memory 2904, within static memory 2906, and/or within processor 2902 during execution thereof by computer system 2900, main memory 2904 and processor 2902 also constituting machine-readable media.

While machine-readable medium 2922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 2924 may further be transmitted or received over a communications network 2926 using a transmission medium. Instructions 2924 may be transmitted using network interface device 2920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising: a processor displaying, via a display device, a first set of one or more graphical interfaces, wherein the one or more graphical interfaces of the first set include one or more menu options for a driver of a vehicle to set one or more criteria to filter one or more ride requests from a plurality of passengers; the processor displaying, via the display device, a second set of one or more graphical interfaces, wherein the one or more graphical interfaces of the second set each includes a first display region with (i) a map to assist the driver to navigate from a pick-up location of a first one of the plurality of passengers to a drop-off location of the first passenger, and (ii) up-to-the-moment information about a location of the vehicle with respect to at least one of the pick-up location or the drop-off location of the first passenger; the processor displaying, via the display device, a third set of one or more graphical interfaces, wherein the one or more graphical interfaces of the third set (i) are displayed after the driver has arrived at the drop-off location of the first passenger, and (ii) include a first display element for the driver to provide an evaluation of the first passenger; and the processor displaying, via the display device, a notification of a ride request from a second passenger, wherein the notification is displayed simultaneously with one of the graphical interfaces from the first, second or third set, wherein the notification is displayed regardless of whether the graphical interface from the first, second or third set is currently being displayed, and wherein the first set of graphical interfaces further includes a menu option in addition to the one or more menu options for the driver to specify a price multiplier so that a fare charged by the driver is set equal to a fare calculated by a transportation server multiplied by the price multiplier.

2. The method of claim 1, wherein one of the one or more menu options of the one or more graphical interfaces of the first set allows the driver to specify a pick-up area so that only ride requests with a pick-up location within the pick-up area are provided to the driver.

3. The method of claim 1, wherein one of the one or more menu options of the one or more graphical interfaces of the first set allows the driver to specify a drop-off area so that only ride requests with a drop-off location within the drop-off area are provided to the driver.

4. The method of claim 1, wherein one of the one or more menu options of the one or more graphical interfaces of the first set allows the driver to specify a rider generosity threshold.

5. The method of claim 1, wherein the first set of graphical interfaces further includes a menu option in addition to the one or more menu options, wherein the additional menu option allows the driver to specify a navigation application to be used by the driver to navigate from the pick-up location of the first passenger to the drop-off location of the first passenger.

6. The method of claim 1, wherein each of the one or more graphical interfaces of the second set further includes a second display region adjacent to the first display region, the second display region having a button for accepting input from the driver, and the input specifying at least one of whether the driver accepts a ride request from the first passenger, whether the first passenger has boarded the vehicle, or whether the vehicle has arrived at the drop-off location of the first passenger.

7. The method of claim 1, wherein the one or more graphical interfaces of the third set include a second display element that allows the driver to specify whether the driver would like to receive additional ride requests.

8. The method of claim 1, wherein the notification of the ride request from the second passenger specifies whether the driver is a favorite driver of the second passenger.

9. The method of claim 1, wherein the notification of the ride request from the second passenger blocks only a portion of the graphical interface from the first, second or third set that is being displayed simultaneously with the notification.

10. A system comprising: a display device; one or more processors; and a memory communicatively coupled to the one or more processors, the memory storing instructions that, upon execution by the one or more processors, causes the one or more processors to perform steps comprising: displaying, on the display device, a first set of one or more graphical interfaces, wherein the one or more graphical interfaces of the first set include one or more menu options for a driver of a vehicle to set one or more criteria to filter one or more ride requests from a plurality of passengers; displaying, on the display device, a second set of one or more graphical interfaces, wherein the one or more graphical interfaces of the second set each includes a first display region with (i) a map to assist the driver to navigate from a pick-up location of a first one of the plurality of passengers to a drop-off location of the first passenger, and (ii) up-to-the-moment information about a location of the vehicle with respect to at least one of the pick-up location or the drop-off location of the first passenger; displaying, on the display device, a third set of one or more graphical interfaces, wherein the one or more graphical interfaces of the third set (i) are displayed after the driver has arrived at the drop-off location of the first passenger, and (ii) include a display element for the driver to provide an evaluation of the first passenger; and displaying, on the display device, a notification of a ride request from a second passenger, wherein the notification is displayed simultaneously with one of the graphical interfaces from the first, second or third set, wherein the notification is displayed regardless of whether the graphical interface from the first, second or third set is currently being displayed, and wherein the first set of graphical interfaces further includes a menu option in addition to the one or more menu options for the driver to specify a price multiplier so that a fare charged by the driver is set equal to a fare calculated by a transportation server multiplied by the price multiplier.

11. The system of claim 10, wherein one of the one or more menu options of the one or more graphical interfaces of the first set allows the driver to specify a pick-up area so that only ride requests with a pick-up location within the pick-up area are provided to the driver.

12. The system of claim 10, wherein one of the one or more menu options of the one or more graphical interfaces of the first set allows the driver to specify a drop-off area so that only ride requests with a drop-off location within the drop-off area are provided to the driver.

13. The system of claim 10, wherein each of the one or more graphical interfaces of the second set further includes a second display region adjacent to the first display region, the second display region having a button for accepting input from the driver, and the input specifying at least one of whether the driver accepts a ride request from the first passenger, whether the first passenger has boarded the vehicle, or whether the vehicle has arrived at the drop-off location of the first passenger.

14. The system of claim 10, wherein the notification of the ride request from the second passenger blocks only a portion of the graphical interface from the first, second or third set that is being displayed simultaneously with the notification.

15. A non-transitory computer-readable storage medium comprising instructions stored thereon that upon execution cause one or more processors of a device to perform operations comprising: displaying, on a display device, a first set of one or more graphical interfaces, wherein the one or more graphical interfaces of the first set include one or more menu options for a driver of a vehicle to set one or more criteria to filter one or more ride requests from a plurality of passengers; displaying, on the display device, a second set of one or more graphical interfaces, wherein the one or more graphical interfaces of the second set each includes a first display region with (i) a map to assist the driver to navigate from a pick-up location of a first one of the plurality of passengers to a drop-off location of the first passenger, and (ii) up-to-the-moment information about a location of the vehicle with respect to at least one of the pick-up location or the drop-off location of the first passenger; displaying, on the display device, a third set of one or more graphical interfaces, wherein the one or more graphical interfaces of the third set (i) are displayed after the driver has arrived at the drop-off location of the first passenger, and (ii) include a display element for the driver to provide an evaluation of the first passenger; and displaying, on the display device, a notification of a ride request from a second passenger, wherein the notification is displayed simultaneously with one of the graphical interfaces from the first, second or third set, wherein the notification is displayed regardless of whether the graphical interface from the first, second or third set is currently being displayed, and wherein the first set of graphical interfaces further includes a menu option in addition to the one or more menu options for the driver to specify a price multiplier so that a fare charged by the driver is set equal to a fare calculated by a transportation server multiplied by the price multiplier.

16. The non-transitory computer-readable storage medium of claim 15, wherein one of the one or more menu options of the one or more graphical interfaces of the first set allows the driver to specify a pick-up area so that only ride requests with a pick-up location within the pick-up area are provided to the driver.

17. The non-transitory computer-readable storage medium of claim 15, wherein one of the one or more menu options of the one or more graphical interfaces of the first set allows the driver to specify a drop-off area so that only ride requests with a drop-off location within the drop-off area are provided to the driver.

18. The non-transitory computer-readable storage medium of claim 15, wherein each of the one or more graphical interfaces of the second set further includes a second display region adjacent to the first display region, the second display region having a button for accepting input from the driver, and the input specifying at least one of whether the driver accepts a ride request from the first passenger, whether the first passenger has boarded the vehicle, or whether the vehicle has arrived at the drop-off location of the first passenger.

19. The non-transitory computer-readable storage medium of claim 15, wherein the notification of the ride request from the second passenger blocks only a portion of the graphical interface from the first, second or third set that is being displayed simultaneously with the notification.

* * * * *